(12) United States Patent
Tunstall-Pedoe et al.

(10) Patent No.: US 9,805,089 B2
(45) Date of Patent: Oct. 31, 2017

(54) LOCAL BUSINESS AND PRODUCT SEARCH SYSTEM AND METHOD

(75) Inventors: William Tunstall-Pedoe, Cambridge (GB); Petra Elisabeth Holmes, Cambridge (GB); Jonathan Gough, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 544 days.

(21) Appl. No.: 12/702,153

(22) Filed: Feb. 8, 2010

(65) Prior Publication Data

US 2010/0205167 A1 Aug. 12, 2010

Related U.S. Application Data

(60) Provisional application No. 61/151,348, filed on Feb. 10, 2009.

(51) Int. Cl.
G06F 17/30 (2006.01)

(52) U.S. Cl.
CPC .............................. *G06F 17/30386* (2013.01)

(58) Field of Classification Search
CPC ............... G06Q 30/0601; G06Q 30/02; G06Q 30/0205; G06Q 30/0282; G06Q 30/0639; G06Q 30/0641
USPC .................................. 707/706, 769, E17.108
See application file for complete search history.

(56) References Cited

U.S. PATENT DOCUMENTS

| | | | |
|---|---|---|---|
| 4,958,285 A | 9/1990 | Tominaga | |
| 5,197,005 A | 3/1993 | Shwartz et al. | |
| 5,282,265 A | 1/1994 | Suda et al. | |
| 5,363,473 A | 11/1994 | Stolfo | |
| 5,404,506 A | 4/1995 | Fujisawa et al. | |
| 5,412,756 A | 5/1995 | Bauman et al. | |
| 5,555,408 A | 9/1996 | Fujisawa et al. | |
| 5,594,837 A | 1/1997 | Noyes | |
| 5,649,190 A | 7/1997 | Sharif-Askary et al. | |
| 5,675,819 A | 10/1997 | Schuetze | |
| 5,715,468 A | 2/1998 | Budzinski | |
| 5,778,157 A | 7/1998 | Oatman et al. | |
| 5,794,050 A | 8/1998 | Dahlgren et al. | |
| 5,809,493 A | 9/1998 | Ahamed et al. | |
| 5,878,406 A | 3/1999 | Noyes | |
| 6,009,459 A | 12/1999 | Belfiore et al. | |

(Continued)

FOREIGN PATENT DOCUMENTS

| | | |
|---|---|---|
| FR | 2865055 | 7/2005 |
| WO | WO 00/41090 A1 | 7/2000 |

(Continued)

OTHER PUBLICATIONS

U.S. Final Office Action dated Jun. 28, 2012, Issued in U.S. Appl. No. 12/269,707.

(Continued)

*Primary Examiner* — Kris Mackes
*Assistant Examiner* — Soheila (Gina) Davanlou
(74) *Attorney, Agent, or Firm* — Weaver Austin Villeneuve & Sampson LLP

(57) ABSTRACT

Computer implemented systems and methods are described that enable customers to search for a product, and obtain a list of retail locations that are likely to provide that product without any need for any specific information about the stock or products held by that retailer.

22 Claims, 15 Drawing Sheets

(56) References Cited

U.S. PATENT DOCUMENTS

| | | | |
|---|---|---|---|
| 6,029,182 A | 2/2000 | Nehab et al. | |
| 6,138,085 A | 10/2000 | Richardson et al. | |
| 6,263,335 B1 | 7/2001 | Paik et al. | |
| 6,289,513 B1 | 9/2001 | Bentwich | |
| 6,377,944 B1 | 4/2002 | Busey et al. | |
| 6,438,533 B1 | 8/2002 | Spackman et al. | |
| 6,446,081 B1 | 9/2002 | Preston | |
| 6,484,149 B1 | 11/2002 | Jammes et al. | |
| 6,498,921 B1 | 12/2002 | Ho et al. | |
| 6,560,590 B1 | 5/2003 | Shwe et al. | |
| 6,567,805 B1 | 5/2003 | Johnson et al. | |
| 6,578,022 B1 | 6/2003 | Foulger et al. | |
| 6,584,464 B1 | 6/2003 | Warthen | |
| 6,604,094 B1 | 8/2003 | Harris | |
| 6,665,640 B1 | 12/2003 | Bennett et al. | |
| 6,704,747 B1 | 3/2004 | Fong | |
| 6,735,592 B1 | 5/2004 | Neumann et al. | |
| 6,766,320 B1 | 7/2004 | Wang et al. | |
| 6,779,060 B1 | 8/2004 | Azvine et al. | |
| 6,804,637 B1 | 10/2004 | Tokuda et al. | |
| 6,823,325 B1 | 11/2004 | Davies et al. | |
| 6,910,003 B1 | 6/2005 | Arnold et al. | |
| 6,952,666 B1 | 10/2005 | Weise | |
| 6,986,104 B2 | 1/2006 | Green et al. | |
| 6,996,570 B2 | 2/2006 | Noble et al. | |
| 7,013,308 B1 | 3/2006 | Tunstall-Pedoe | |
| 7,039,875 B2 | 5/2006 | Khalfay et al. | |
| 7,050,977 B1* | 5/2006 | Bennett | 704/270.1 |
| 7,069,254 B2 | 6/2006 | Foulger et al. | |
| 7,092,928 B1 | 8/2006 | Elad et al. | |
| 7,415,044 B2 | 8/2008 | Kallstenius | |
| 7,418,434 B2 | 8/2008 | Barry | |
| 7,447,667 B2 | 11/2008 | Gong et al. | |
| 7,454,430 B1 | 11/2008 | Komissarchik et al. | |
| 7,526,425 B2 | 4/2009 | Marchisio et al. | |
| 7,536,368 B2 | 5/2009 | Todhunter | |
| 7,539,656 B2 | 5/2009 | Fratkina et al. | |
| 7,596,609 B1 | 9/2009 | Refuah et al. | |
| 7,707,023 B2 | 4/2010 | Ejerhed | |
| 7,707,160 B2 | 4/2010 | Tunstall-Pedoe | |
| 7,734,623 B2 | 6/2010 | Witbrock et al. | |
| 7,739,104 B2 | 6/2010 | Berkan et al. | |
| 7,752,154 B2 | 7/2010 | Friedlander et al. | |
| 7,814,096 B1 | 10/2010 | Roy | |
| 7,844,562 B2 | 11/2010 | Gong et al. | |
| 7,962,326 B2 | 6/2011 | Tsourikov et al. | |
| 7,974,714 B2 | 7/2011 | Hoffberg | |
| 8,024,177 B2 | 9/2011 | Lenat et al. | |
| 8,126,890 B2 | 2/2012 | Bobick et al. | |
| 8,219,599 B2 | 7/2012 | Tunstall-Pedoe | |
| 8,468,122 B2 | 6/2013 | Tunstall-Pedoe | |
| 8,666,928 B2 | 3/2014 | Tunstall-Pedoe | |
| 8,719,318 B2 | 5/2014 | Tunstall-Pedoe | |
| 8,838,659 B2 | 9/2014 | Tunstall-Pedoe | |
| 9,098,492 B2 | 8/2015 | Tunstall-Pedoe | |
| 9,110,882 B2 | 8/2015 | Overell et al. | |
| 9,519,681 B2 | 12/2016 | Tunstall-Pedoe | |
| 2001/0047290 A1 | 11/2001 | Petras et al. | |
| 2001/0053968 A1 | 12/2001 | Galitsky et al. | |
| 2002/0010714 A1 | 1/2002 | Hetherington | |
| 2002/0059069 A1 | 5/2002 | Hsu et al. | |
| 2002/0059157 A1 | 5/2002 | Spooner et al. | |
| 2002/0107844 A1 | 8/2002 | Cha et al. | |
| 2002/0107861 A1* | 8/2002 | Clendinning et al. | 707/101 |
| 2002/0116176 A1 | 8/2002 | Tsourikov et al. | |
| 2002/0147631 A1* | 10/2002 | Smith | G06Q 10/06375 705/7.31 |
| 2002/0156763 A1 | 10/2002 | Marchisio | |
| 2002/0198697 A1 | 12/2002 | Datig | |
| 2003/0014421 A1 | 1/2003 | Jung | |
| 2003/0093276 A1 | 5/2003 | Miller et al. | |
| 2003/0126136 A1 | 7/2003 | Omoigui | |
| 2003/0130976 A1 | 7/2003 | Au | |
| 2003/0172075 A1 | 9/2003 | Reisman | |
| 2003/0220835 A1* | 11/2003 | Barnes, Jr. | G06Q 10/1053 705/14.36 |
| 2004/0019595 A1 | 1/2004 | Bhogal et al. | |
| 2004/0030556 A1 | 2/2004 | Bennett | |
| 2004/0064456 A1 | 4/2004 | Fong et al. | |
| 2004/0088158 A1 | 5/2004 | Sheu et al. | |
| 2004/0107088 A1 | 6/2004 | Budzinski | |
| 2004/0117395 A1 | 6/2004 | Gong et al. | |
| 2004/0122656 A1 | 6/2004 | Abir | |
| 2004/0122661 A1 | 6/2004 | Hawkinson et al. | |
| 2004/0162852 A1 | 8/2004 | Qu et al. | |
| 2004/0167875 A1 | 8/2004 | Sneiders | |
| 2004/0167909 A1 | 8/2004 | Wakefield et al. | |
| 2004/0172237 A1 | 9/2004 | Saldanha et al. | |
| 2004/0205065 A1 | 10/2004 | Petras et al. | |
| 2004/0220969 A1 | 11/2004 | Cho | |
| 2004/0243568 A1 | 12/2004 | Wang et al. | |
| 2004/0249635 A1 | 12/2004 | Bennett | |
| 2004/0260604 A1* | 12/2004 | Bedingfield, Sr. | 705/14 |
| 2005/0021517 A1 | 1/2005 | Marchisio et al. | |
| 2005/0027512 A1 | 2/2005 | Waise | |
| 2005/0041692 A1 | 2/2005 | Kallstenius | |
| 2005/0043940 A1 | 2/2005 | Elder | |
| 2005/0065777 A1 | 3/2005 | Dolan et al. | |
| 2005/0076037 A1 | 4/2005 | Shen | |
| 2005/0108256 A1 | 5/2005 | Wakefield | |
| 2005/0114282 A1 | 5/2005 | Todhunter | |
| 2005/0120051 A1 | 6/2005 | Danner et al. | |
| 2005/0144000 A1 | 6/2005 | Yamasaki et al. | |
| 2005/0149558 A1 | 7/2005 | Zhuk | |
| 2005/0171746 A1 | 8/2005 | Thalhammer-Reyero | |
| 2005/0240546 A1 | 10/2005 | Barry | |
| 2005/0256888 A1 | 11/2005 | McConnell | |
| 2005/0273771 A1 | 12/2005 | Chang et al. | |
| 2005/0278309 A1 | 12/2005 | Evans et al. | |
| 2005/0289124 A1 | 12/2005 | Kaiser et al. | |
| 2006/0004742 A1 | 1/2006 | Datla et al. | |
| 2006/0053000 A1 | 3/2006 | Moldovan et al. | |
| 2006/0100998 A1 | 5/2006 | Edwards et al. | |
| 2006/0112029 A1 | 5/2006 | Estes | |
| 2006/0136375 A1 | 6/2006 | Cox et al. | |
| 2006/0161544 A1 | 7/2006 | Lee et al. | |
| 2006/0167931 A1 | 7/2006 | Bobick et al. | |
| 2006/0184491 A1 | 8/2006 | Gupta et al. | |
| 2006/0217818 A1 | 9/2006 | Fujiwara | |
| 2006/0224569 A1 | 10/2006 | DeSanto et al. | |
| 2006/0253431 A1 | 11/2006 | Bobick et al. | |
| 2007/0005566 A1 | 1/2007 | Bobick et al. | |
| 2007/0011125 A1 | 1/2007 | Angele | |
| 2007/0033221 A1 | 2/2007 | Copperman et al. | |
| 2007/0043708 A1 | 2/2007 | Tunstall-Pedoe | |
| 2007/0055656 A1 | 3/2007 | Tunstall-Pedoe | |
| 2007/0067293 A1 | 3/2007 | Yu | |
| 2007/0299799 A1 | 12/2007 | Meehan et al. | |
| 2008/0040308 A1* | 2/2008 | Ranganathan et al. | 707/1 |
| 2008/0109212 A1 | 5/2008 | Witbrock et al. | |
| 2008/0140387 A1 | 6/2008 | Linker | |
| 2008/0154625 A1* | 6/2008 | Serbanescu | G06Q 30/0601 705/26.1 |
| 2008/0221983 A1 | 9/2008 | Ausiannik et al. | |
| 2008/0250347 A1 | 10/2008 | Gray et al. | |
| 2008/0270378 A1* | 10/2008 | Setlur et al. | 707/5 |
| 2008/0301095 A1 | 12/2008 | Zhu et al. | |
| 2008/0301120 A1 | 12/2008 | Zhu et al. | |
| 2009/0012865 A1* | 1/2009 | Celik | 705/14 |
| 2009/0070284 A1 | 3/2009 | Tunstall-Pedoe | |
| 2009/0070322 A1 | 3/2009 | Salvetti et al. | |
| 2009/0192968 A1 | 7/2009 | Tunstall-Pedoe | |
| 2010/0205167 A1 | 8/2010 | Tunstall-Pedoe | |
| 2010/0332338 A1* | 12/2010 | Burnett | 705/26 |
| 2011/0173094 A1* | 7/2011 | Krueger | 705/26.41 |
| 2011/0307435 A1 | 12/2011 | Overell | |
| 2012/0036145 A1 | 2/2012 | Tunstall-Pedoe | |
| 2013/0041921 A1 | 2/2013 | Cooper et al. | |
| 2013/0073518 A1 | 3/2013 | Srivastava et al. | |
| 2013/0253913 A1 | 9/2013 | Tunstall-Pedoe | |
| 2013/0254182 A1 | 9/2013 | Tunstall-Pedoe | |
| 2013/0254221 A1 | 9/2013 | Tunstall-Pedoe | |
| 2013/0262125 A1 | 10/2013 | Tunstall-Pedoe | |

(56) References Cited

U.S. PATENT DOCUMENTS

| | | |
|---|---|---|
| 2013/0275121 A1 | 10/2013 | Tunstall-Pedoe |
| 2014/0324750 A1 | 10/2014 | Christophe et al. |
| 2014/0351281 A1 | 11/2014 | Tunstall-Pedoe |
| 2015/0356463 A1 | 12/2015 | Overell et al. |

FOREIGN PATENT DOCUMENTS

| | | |
|---|---|---|
| WO | WO 00/57302 | 9/2000 |
| WO | WO 2005/073908 | 8/2005 |
| WO | WO2007/083079 | 7/2007 |
| WO | WO2007/101973 | 9/2007 |
| WO | WO 2009/065029 A1 | 5/2009 |
| WO | WO 2010/092375 | 8/2010 |

OTHER PUBLICATIONS

Aslandogan, Y.A., et al. "Techniques and Systems for Image and Video Retrieval," *IEEE Transactions on Knowledge and Data Engineering*, 11:1, 1999, pp. 56-63 (8 Pages).
Clark, Peter, et al. "A Knowledge-Based Approach to Question-Answering," *AAAI '99 Fall Symposium on Question-Answring Systems*, Mar. 1999 (16 Pages).
Cox, R.V., et al. "On the Applications of Multimedia Processing to Communications," *Proceedings of the IEEE*, 86:5, pp. 755-825 (70 Pages).
Cuppens, F., et al. "Cooperative Answering: A Methodology to Provide Intelligent Access to Databases," *Onera-Cert* (21 Pages).
De Roeck, A., et al. "YPA—An Intelligent Directory Enquiry Assistant," *Technology Journal* 16:3, pp. 144-155 (11 Pages).
Fensel, Dieter, et al. "On2Broker: Semantic-Based Access to Information Sources at the WWW," *Webnet 99 World Conference on the WWW and Internet Proceedings* (6 Pages).
Heflin, Jeff, et al. "Reading Between the Lines: Using SHOE to Discover Implicit Knowledge from the Web, " *AI and Information Integration*, 1998 (7 Pages).
Hendrix, G.G., et al. "Transportable Natural-Language Interfaces to Databases," *NTIS*, 1981 (8 Pages).
Krause, J., et al. "Multimodality and Object Orientation in an Intelligent Materials Information System," *Journal of Document and Text Management*, 2:1, pp. 48-66, 1994 (20 Pages).
Liu, Mengchi. "Design and Implementation of ROL Deductive Object-Orientated Database System," *Intelligent Information Systems*, 15:2, 2000, pp. 121-146 (26 Pages).
MacKinnon, LM., et al. "A Model for Query Decomposition and Answer Construction in Heterogeneous Distributed Database Systems," *Journal of Intelligent Informaiton Systems: Integrating Artificial Intelligence and Database Technologies*, 11:1, 1998, pp. 69-87 (19 Pages).
Marin, Philippe et al. "Knowledge Retrieval and the World Wide Web," *IEEE Intelligent Systems*, 2000 (8 Pages).
Miikkulainen, R. "DISCERN: A Distributed Artificial Neural Network Model of Script Processing Memory," *Neural Networks Research Group*, 1990 (2 Pages).
Notice of Allowance dated Sep. 29, 2005, U.S. Appl. No. 09/990,188.
Notice of Allowance dated May 20, 2005, U.S. Appl. No. 09/990,188.
Final Rejection dated Jan. 5, 2005, U.S. Appl. No. 09/990,188.
Non-final Rejection dated Jun. 8, 2004, U.S. Appl. No. 09/990,188.
Office Action dated Sep. 23, 2008, U.S. Appl. No. 11/318,316.
Office Action dated Jun. 10, 2009, U.S. Appl. No. 11/318,316.
Notice of Allowance dated Nov. 4, 2009, U.S. Appl. No. 11/318,316.
Office Action dated Dec. 23, 2010, U.S. Appl. No. 12/269,707.
Final Office Action dated Jul. 13, 2011, U.S. Appl. No. 12/269,707.
Office Action dated Oct. 21, 2011, U.S. Appl. No. 12/269,707.
Office Action dated Nov. 23, 2011, U.S. Appl. No. 13/275,155.
Final Office Action dated Feb. 16, 2012, U.S. Appl. No. 13/275,155.
Notice of Allowance dated Apr. 6, 2012, U.S. Appl. No. 13/275,155.
Office Action dated Jun. 10, 2009 from U.S. Appl. No. 11/459,202.
Final Office Action dated Dec. 31, 2009, U.S. Appl. No. 11/459,202.
Office Action dated Mar. 19, 2012, U.S. Appl. No. 11/459,202.
Office Action dated Dec. 9, 2011, U.S. Appl. No. 12/240,699.
Office Action dated Sep. 26, 2011, U.S. Appl. No. 12/240,699.
International Search Report and Written Opinion dated Sep. 18, 2006 for related PCT Application Serial No. PCT/GB2006/050014.
International Preliminary Report on Patentability dated Jul. 31, 2008, PCT/GB2006/050014.
Israel Office Action, IL Patent Application No. 192833, National phase of PCT/GB2006/050014, dated Jan. 18, 2012.
International Search Report and Written Opinion dated Dec. 23, 2008, PCT Application No. PCT/GB2006/050222.
Israel Office Action dated May 22, 2012, Israel Patent Application No. 193913.
EP Examination Report, EP Application No. 06 765 371.7-1225, dated Nov. 12, 2009.
International Search Report and Written Opinion dated May 4, 2010, PCT Application No. PCT/GB2010/050198.
Ahn, Chapter 6: Verbosity:, Human Computation: Ph.D. Thesis Manuscript: Carnegie Mellon University (online), Dec. 7, 2005, pp. 61-68, Retrieved from the Internet: URL:http://reports-archive.adm.cs.cmu.edu/anon/2005/CMU-CS-05-193.pdf>m.
American National Standard, Knowledge Interchange Format, Apr. 10, 2001, http://www.logic.standord.edu/kif/dpans.html, pp. 1-31.
Anonymous: "Question Answering", Wikipedia, the Free Encyclopedia, Feb. 20, 2006, Retrieved from the Internet: URL:http://en.wikipedia.org/w/index.php?title=Question_answering&Oldid=40350205>.
Anonymous: "Commonsense knowledge bases", Wikipedia, The Free Encyclopedia, Jan. 12, 2006, Retrieved from the Internet: URL:http://en.wikipedia.org/w/index.php?title=Commonsense_knowledge_bases&oldid=34905257>.
Cycorp, Features of CycL, Sep. 27, 2001, http://www,cyc.com/cycl.html, pp. 1-59.
Douglas B. Lenat, "CYC: A Large-Scale Investment in Knowledge Infrastructure", Communications of the ACM, Nov. 1995, vol. 38, No. 11, pp. 33-38.
George A. Miller, "WordNet: A Lexical Database for English", Communications of the ACM, Nov. 1995, vol. 38, No. 11, pp. 39-41.
Miller et al., "Introduction to WordNet: An On-line Lexical Database", Revised Aug. 1993, pp. 1-9.
Miller, "Nouns in WordNet: A Lexical Inheritance System", Revised Aug. 1993, pp. 10-25.
Lenat et al., "CYC, WordNet, and EDR: Critiques and Responses", Communications of the ACM, Nov. 1995, vol. 38, No. 11, pp. 45-48.
Fellbaum et al., "Adjectives in WordNet", Revised Aug. 1993, pp. 26-39.
Fellbaum et al., "English Verbs as Semantic Net", pp. 40-61, no date.
Beckwith et al, "Design and Implementation of the WordNet Lexical Database and Searching Software", 1998, pp. 62-82.
Berners-Lee, "Semantic Web Road Map", http://www.w3.org/DesignIssues/Semantic.html, Sep. 1998, pp. 1-9.
Berners-Lee, "What the Semantic Web can represent", http://www.w3.org/DesignIssues/RDFnot.html, Sep. 1998, pp. 1-6.
Resource Description Framework (RDF) Model and Syntax Specification, http://www.w3.org/TP/PR-rdf-syntax/, Jan. 5, 1999, pp. 1-40.
Brachman et al. "Living with CLASSIC: When and How to Use a KL-ONE-Like Language", Principles of Semantic Networks: Explorations in the Representation of Knowledge, 1991, pp. 401-456.
J. Curtis, et al. "On the Effective Use of Cyc in a Question Answering System", Proceedings of the Workshop on Knowledge and Reasoning for Answering Questions, (KRAQ'05): Jul. 30-Aug. 5, 2005, pp. 61-70, Retrieved from Internet: URL:http://www.irit.fr/recherches/ILPL/kraq05V1.pdf.
Liu et al., "ConceptNet—a practical commonsense reasoning toolkit," BT Technology Journal, vol. 22, No. 4, Oct. 2004, pp. 211-226.

(56) References Cited

OTHER PUBLICATIONS

Liu et al., "Commonsense Reasoning in and over Natural Language," Media Laboratory, Massachusetts Institute of Technology, 2004, pp. 1-14.
Liu et al., "Goose: A Goal-Oriented Search Engine with Commonsense" Proceedings of the 2nd International Conference on Adaptive Hypermedia and Adaptive Web-Based Systems (AH'02); In Lecture Notes in Computer Science, vol. 2347, May 29, 2002, pp. 253-263, Retrieved from the Internet: URL:http://dx.doi.org/10.1007/3-540-47952-X_27.
H. Lieberman, et al. "Beating Commensense Into Interactive Applications", AI Magazine, vol. 25, No. 4, 2004, pp. 63-76, Retrieved from Internet: URL:https://www.aaai.org/ojs/index.php/aimagazine/article/viewFile/1785/1683.
Stork, D., "An architecture supporting the collection and monitoring of data openly contributed over the World Wide Web," Workshop on Enabling Technologies: Infrastructure for Collaborative Enterprises, MIT, Jun. 2001, pp. 1-6.
"Mindpixel," Wikipedia, the free encyclopedia, Jul. 15, 2006.
Stork, D., Open data collection for training intelligent software in the Open Mind Initiative, Proceedings of the Engineering Intelligent Systems Symposium (EIS2000), Paisley Scotland, Jun. 2000, pp. 1-7.
Hearst, M., "Building intelligent systems one e-citizen at a time," Trends & Controversies, IEEE Intelligent Systems, May/Jun. 1999, pp. 16-20.
Li et al., "NaLIX: an Interactive Natural Language Interface for Querying XML", SIGMOD 2005, Jun. 14-16, 2005, XP002397059, 3 pages.
Baxter et al., "Interactive Natural Language Explanations of Cyc Inferences", AAAI 2005: International Symposium on Explanation-Aware Computing, Nov. 30, 2005, XP002397060, 11 pages.
KBMS-Prototype KRISYS, User Manual Overview "KBMS-Prototype KRISYS User Manual", Dec. 1, 1992, pp. 1-94.
Pieters, W., "Case-based Tecyhniques for Conversatinal Agents in Virtual Environments", Thesis, University of Twente, Jun. 2002, 118 pages.
P. Singh, et al. "Teaching machines about everday life" BT Technology, vol. 22, No. 4, Oct. 2004, pp. 227-240, Retrieved from Internet: URL:http://dx.doi.org/10.1023/B:BTTJ.0000047601.53388.74.
P. Singh, et al. "The Public Acquisition of Commonsense Knowledge", Report on the AAAI 2002 Spring Symposium on Acquiring (and Using) Linguistic (and World) Knowledge for Information Access, Mar. 2002, retrieved from Internet: URL:http://web.media.mit.edu/{push/AAAI200 2-Spring.pdf.
P. Singh, et al., "Open Mind Common Sense: Knowledge Acquisition from the General Publiction", Proceedings of the Confederated International Conferences on the Move to Meaningful Internet Systems (Coopis, DOA & ODBASE 2002); In Lecture Notes in Computer Science, vol. 2519, Oct. 28, 2002-Nov. 1, 2002, pp. 1223-1237, Retrieved from Internet: URL:http://dx.doi.org/10.1007/3-540-36124.
Sun, G. "XML-based Agent Scripts and Inference Mechanisms", Thesis, University of North Texas, Aug. 2003, 55 pages.
Trehub, A. "The Cognitive Brain—Chapter 6: Building a Semantic Network", MIT Press, 1991, pp. 99-115.
Wallace, R. S., "The Elements of AIML Style", ALICE A.I. Foundation, Inc. Mar. 28, 2003, 86 pages.
M. Witbrock, et al., "Knowledge Begets Knowledge: Steps Towards Assisted Acquisition in Cyc", On Knowledge Collection from Volunteer Contributors, Mar. 21 2005-Mar. 23, 2005, Retrieved from Internet: URL:http://www.cyc.com/doc/white_papers/AA.
M. Witbrock, et al., "An Interactive Dialogue System for Knowledge in Cyc", Proceedings of the Workshop on Mixed-Initiative Intelligent Systems (MIIS'03); 18th International Joint Conference on Artificial Intelligence, Aug. 9-15, 2003, Retrieved from Internet: URL:http://lalab.gmu.edu/miis/papers/witbrock.pdf.
Toshio Yokoi, "The EDR Electronic Dictionary", Communications of the ACM, Nov. 1995, vol. 38, No. 11, pp. 42-44.

U.S. Pre-Brief Appeal Conference Decision dated Jan. 4, 2013 issued in U.S. Appl. No. 12/269,707.
Baxter et al., "Interactive Natural Language Explanations of Cyc Inferences", In AAAI 2005: International Symposium on Explanation-Aware Computing, Nov. 30, 2005 (Nov. 30, 2005), XP002397060, 12 pp.
McKinstry, Chris, "Mind as Space", Preprint for "The Turing Test Sourcebook", [Online] May 2005 (May 2005), XP007906221 Retrieved from the Internet: URL: http: //web. Archive.org/web/20050501011659/http://www.mindpixel.com/PDF/mindasspace.pdf, 26 pp.
U.S. Allowed Claims dated Feb. 25, 2013 for U.S. Appl. No. 12/269,707.
U.S. Notice of Allowance dated Feb. 25, 2013 issued in U.S. Appl. No. 12/269,707.
U.S. Office Action dated Jul. 12, 2013 issued in U.S. Appl. No. 13/896,144.
U.S. Final Office Action dated Dec. 11, 2013 issued in U.S. Appl. No. 13/896,144.
U.S. Office Action dated Jul. 15, 2013 issued in U.S. Appl. No. 13/896,857.
U.S. Notice of Allowance dated Jan. 8, 2014 issued in U.S. Appl. No. 13/896,857.
U.S. Final Office Action dated Mar. 27, 2013 issued in U.S. Appl. No. 11/459,202.
U.S. Office Action dated Jul. 9, 2013 issued in U.S. Appl. No. 11/459,202.
U.S. Notice of Allowance dated Oct. 29, 2013 issued in U.S. Appl. No. 11/459,202.
U.S. Office Action dated Dec. 18, 2013 issued in U.S. Appl. No. 13/896,878.
U.S. Office Action (Applicant Initiated Interview Summary) dated Mar. 26, 2014 issued in U.S. Appl. No. 13/896,878.
U.S. Final Office Action dated Apr. 28, 2014 issued in U.S. Appl. No. 13/896,878.
U.S. Office Action dated Dec. 17, 2013 issued in U.S. Appl. No. 13/896,078.
U.S. Office Action (Applicant Initiated Interview Summary) dated Mar. 26, 2014 issued in U.S. Appl. No. 13/896,078.
U.S. Final Office Action dated Apr. 23, 2014 issued in U.S. Appl. No. 13/896,078.
U.S. Office Action dated Dec. 26, 2013 issued in U.S. Appl. No. 13/896,611.
U.S. Office Action (Applicant Initiated Interview Summary) dated Mar. 24, 2014 issued in U.S. Appl. No. 13/896,611.
U.S. Final Office Action dated Apr. 23, 2014 issued in U.S. Appl. No. 13/896,611.
U.S. Office Action dated May 2, 2013 issued in U.S. Appl. No. 12/240,699.
U.S. Final Office Action dated Sep. 10, 2013 issued in U.S. Appl. No. 12/240,699.
U.S. Office Action dated Jan. 21, 2014 issued in U.S. Appl. No. 12/240,699.
U.S. Office Action dated Aug. 9, 2013 issued in U.S. Appl. No. 13/106,562.
U.S. Final Office Action dated Feb. 27, 2014 issued in U.S. Appl. No. 13/106,562.
PCT International Preliminary Report on Patentability and Written Opinion dated Jun. 30, 2009 issued in PCT Application No. PCT/GB2006/050222.
Israel Office Action dated Oct. 23, 2012 issued in Israel Patent Application No. 193913.
PCT International Preliminary Report on Patentability and Written Opinion dated Aug. 25, 2011 issued in PCT/GB2010/050198.
European Examination Report dated Sep. 16, 2013 issued in EP 06 700 771.6-1951.
Israel Office Action dated Sep. 23, 2012 issued in IL Patent Application No. 192833.
Agichtein, E. et al., (Apr. 2001) "Learning Search Engine Specific Query Transformations for Question Answering", Proceedings of the 10th International Conference on World Wide Web, ACM, pp. 169-178. DOI:10.1145/371920.371976.

(56) References Cited

OTHER PUBLICATIONS

"Androutsopoulos, et al. (1995) ""Natural language interfaces to databases—an Introduction,"" arXiv preprint arXiv:cmplg/9503016v2, 50 pages".

De Pietro, O. et al., (Aug. 2005) "Automatic update of AIML Knowledge Base in e-Learning environment", Proceedings of Computers and Advanced Technology in Education, pp. 29-31.

Enembreck F. et al., (2002) "Personal assistant to improve CSCW", The 7th International Conference on Computer Supported Cooperative Work in Design, IEEE, pp. 329-335. DOI:10.1109/CSCWD.2002.1047710.

Georges, M.T. (2000) "The Problem of Storing Common Sense in Artificial Intelligence", Context in CYC, Doctoral Dissertation directed by Dr. Jaime Nubiola, University of Navarra, Ecclesiastial Faculty of Philosophy, 153 pages.

Goh, O.S. et al., (2003) "Intelligent Agent Technology in E-commerce", Intelligent Data Engineering and Automated Learning (IDEAL 2003), Lecture Notes in Computer Science, 2690:10-17.

Goh, O.S. et al., (Aug. 27-29, 2005) "Automated Knowledge Extraction from Internet for a Crisis Communication Portal", Fuzzy Systems and Knowledge Discovery (FSKD 2005), Lecture Notes in Computer Science, 3614:1226-1235.

Guha, R. et al. (2003) "Varieties of contexts", Modeling and Using Context. Lecture Notes in Computer Science, 2680:14 pages.

Jijkoun, et al., (Oct. 31-Nov. 5, 2005) "Retrieving Answers from Frequently Asked Questions Pages on the Web", Informatics Institute, University of Amsterdam, 76-83, (8 pages).

Katz, B. et al., (2002) "Natural Language Annotations for the Semantic Web", On the Move to Meaningful Internet Systems 2002:CoopIS, DOA, and ODBASE. Springer Berlin Heidelberg, 1317-1331. DOI: 10.1007/3540-36124-3_83SIG.

Lenat, D. (Oct. 28, 1998) "The dimensions of context-space", CYCORP Report, CYCORP, 3721 Executive Center Drive, Suite 100, Austin, TX 78731, 1-78 pages.

Maedche, A. et al. (Mar./Apr. 2001) "Ontology Learning for the Semantic Web," IEEE Intelligent Systems, pp. 72-79.

Matuszek, C. et al. (Jul. 1999) "Searching for Common Sense: Populating CycTM from the Web," AAAI, pp. 1430-1435.

McCarthy, J. (1993) "Notes on formalizing context", Computer Science Department, Stanford University, Stanford, CA 94305 U.S.A., 1-13 pages.

Radev, D. et al. (2000) "Ranking suspected answers to natural language questions using predictive annotation", In Proceedings of the sixth conference on Applied natural language processing, pp. 150-157. Association for Computational Linguistics. DOI: 10.3115/974147.974168.

Radev, D. et al. (2002) "Getting Answers to Natural Language Questions on the Web", Journal of the American Society for Information Science and Technology, 53(5):359-364. DOI: 10.1002/asi.10053.

Saquete, E. et al. (2004) "Splitting Complex Temporal Questions for Question Answering systems", Proceedings of the 42nd Annual Meeting on Association for Computational Linguistics. Association for Computational Linguistics, 7 pages.

Shah, U. et al. (Nov. 2002) "Information Retrieval on the Semantic Web", Proceedings of the eleventh international conference on Information and knowledge management. ACM, pp. 461-468. DOI: 10.1145/584792.584868.

Shawar, B.A. (2005) "FAQchat as in Information Retrieval System", Human Language Technologies as a Challenge for Computer Science and Linguistics: Proceedings of the 2nd Language and Technology Conference. Poznan.: Wydawnictwo Poznan skie: with co-operation of Fundacja Uniwersytetu im. A. Mickiewicza, 5 pages.

Siegel, N. et. al. (Nov. 2004) "The Cyc® System: Notes on Architecture," Cycorp, Inc.,9 pages.

Sneiders, E. (2002) "Automated Question Answering Using Question Templates That Cover the Conceptual Model of the Database," Natural Language Processing and Information Systems,Springer, pp. 235-239.

Somers, H.(1998) "New paradigms in MT: the state of play now that the dust has settled," Machine Translation Workshop, ESSLL, 98:12pp.

Suchanek et al., (May 8-12, 2007) "YAGO: A Core of Semantic Knowledge Unifying WordNet and Wikipedia", WWW 2007 / Track: Semantic Web, Session: Ontologies, 10 pages.

Tanaka, T. et al. (2003) "Noun-Noun Compound Machine Translation: A Feasibility Study on Shallow Processing," Proceedings of the ACL 2003 workshop on Multiword expressions: analysis, acquisition and treatment—vol. 18. Association for Computational Linguistics, pp. 17-24.

Zhou, X. (Sep. 2005) "Super-Function Based Machine Translation System for Business User," Tokushima University, Dissertation, 133 pages.

U.S. Appl. No. 14/456,324, filed Aug. 11, 2014, Tunstall-Pedoe.

U.S. Office Action dated Jul. 24, 2014 issued in U.S. Appl. No. 13/896,144.

U.S. Office Action dated Sep. 29, 2014 issued in U.S. Appl. No. 13/896,078.

U.S. Office Action dated Oct. 10, 2014 issued in U.S. Appl. No. 13/896,611.

U.S. Notice of Allowance dated May 13, 2014 issued in U.S. Appl. No. 12/240,699.

U.S. Office Action dated Jun. 11, 2014 issued in U.S. Appl. No. 13/106,562.

U.S. Final Office Action dated Sep. 18, 2014 issued in U.S. Appl. No. 13/106,562.

Israel Office Action dated Apr. 2, 2014 issued in Israel Patent Application No. 193913.

Aumueller, D. (Mar. 2005) "SHAWN: Structure Helps a Wiki Navigate", In Proceedings of the BTW-Workshop WebDB Meets IR, 10 pp.

Bertino et al. (2008) "High-Assurance Integrity Techniques for Databases", Department of Computer Science, Purdue University, 13 pp.

Lieberman, H. et al. (1996) "Instructible agents: Software that just keeps getting better", IBM Systems Journal, 35(3.4):539-556. DOI: 10.1147/sj.353.0539.

Lopez, V. et al. (2004) "Ontology-Driven Question Answering in AquaLog", Natural Language Processing and Information Systems, Lecture Notes in Computer Science, 3136:89-102.

Soricut, (2006) "Automatic question answering using the web: Beyond the Factoid", Inf Retrieval, 9:191-206.

Suchanek et al.(2008) "YAGO:A Large Ontology from Wikipedia and WordNet", Web Semantics: Science, Services and Agents on the World Wide Web, 6:203-217.

Wagner, C. (Feb. 18, 2004) "Wiki: A Technology for Conversational Knowledge Management and Group Collaboration", Communications of the Association for Information Systems,13(Article 19):265-289, 27 pp.

U.S. Final Office Action dated Jan. 20, 2015 issued in U.S. Appl. No. 13/896,144.

U.S. Notice of Allowance dated Apr. 9, 2015 issued in U.S. Appl. No. 13/896,611.

U.S. Office Action dated Jan. 7, 2015 issued in U.S. Appl. No. 13/106,562.

U.S. Notice of Allowance dated Apr. 17, 2015 issued in U.S. Appl. No. 13/106,562.

Navigli, Roberto, (Feb. 2009) "Word Sense Disambiguation: A Survey", ACM Computing Surveys, 41(2) Article 10: 69 pages.

U.S. Office Action dated May 22, 2015 issued in U.S. Appl. No. 13/896,078.

U.S. Final Office Action dated Dec. 18, 2015 issued in U.S. Appl. No. 13/896,078.

U.S. Office Action dated May 22, 2015 issued in U.S. Appl. No. 14/456,324.

U.S. Final Office Action dated Sep. 8, 2015 issued in U.S. Appl. No. 14/456,324.

U.S. Office Action dated Dec. 15, 2015 issued in U.S. Appl. No. 14/456,324.

EP Office Action dated Aug. 13, 2015 issued in EP Application No. 06 765 371.7-1225.

(56) References Cited

OTHER PUBLICATIONS

EP Office Action dated Jul. 24, 2015 issued in EP Application No. 10 704 585.8-1952.
EP Summons to attend oral proceedings pursuant to Rule 115(1) EPC dated Dec. 18, 2015 issued in EP Application No. 10 704 585.8-1952.
Arsov et al. (Jun. 19, 2003) "An Approach for Design of the Object-Oriented Databases with Restricted Natural Language Access," *International Conference on Computer Systems and Technologies—CompSysTech'2003*, pp. 147-152.
Chae et al. (Oct. 22, 1995) "Path Expression Processing in Korean Natural Language Query Interface for Object-Oriented Databases," *Systems, Man and Cybernetics, Intelligent Systems for the 21st Century, IEEE*, 1:690-695.
Hahn, et al. (1980). "The anatomy of the natural language dialogue system HAM-RPM," In: Bolc, L. (ed.): *Natural Language Based Computer Systems*: 119-253.
U.S. Office Action dated Jan. 11, 2016 issued in U.S. Appl. No. 13/896,144.
U.S. Office Action dated Jul. 6, 2016 issued in U.S. Appl. No. 13/896,144.
U.S. Final Office Action dated Dec. 2, 2016 issued in U.S. Appl. No. 13/896,144.
U.S. Final Office Action dated Jul. 15, 2016 issued in U.S. Appl. No. 14/456,324.
U.S. Notice of Allowance dated Aug. 18, 2016 issued in U.S. Appl. No. 14/456,324.
European Response to Summons to attend oral proceedings [dated Dec. 18, 2015] dated Mar. 24, 2016 for Application No. EP 10 704 585.8-1952.
European Findings upon submissions to oral proceedings [dated Dec. 18, 2015] dated Mar. 30, 2016 for Application No. EP 10 704 585.8-1952.
European Result of Phone consultation reexamination dated Apr. 25, 2016 issued in Application No. EP 10 704 585.8-1952.
European letter re oral proceedings dated Apr. 29, 2016 issued in Application No. EP 10 704 585.8-1952.
European Provision of the minutes in accordance with Rule 124(4)EPC dated May 27, 2016 issued in Application No. EP 10 704 585.8-1952.
European Decision to refuse a European Patent application dated May 27, 2016 issued in Application No. EP 10 704 585.8-1952.

\* cited by examiner translation

LOCAL BUSINESS AND PRODUCT SEARCH SYSTEM AND METHOD

RELATED APPLICATION DATA

The present application claims priority under 35 U.S.C. 119(e) to U.S. Provisional Patent Application No. 61/151,348 entitled LOCAL BUSINESS AND PRODUCT SEARCH SYSTEM AND METHOD filed on Feb. 10, 2009, the entire disclosure of which is incorporated herein by reference for all purposes.

BACKGROUND OF THE INVENTION

A common situation that people find themselves in is searching for a particular service or product from businesses where the customer needs to be physically present in order to do the transaction. (For the purposes of this description, "retail location" will be used to describe all businesses where goods and services are obtained in person and "product" will include both physical products and services.)

A computer system which knows the stock of all the retailers near the customer could facilitate this, but providing a live feed of stock for thousands of small businesses to a central system presents many difficulties including the lack of existence of electronic stock systems for many of the businesses, and difficulties combining, understanding, and reaching agreement with many different stock and inventory systems for those that do.

SUMMARY OF THE INVENTION

According to various embodiments of the invention, systems, methods, and computer program products are provided for identifying retail locations likely to sell a particular product. A database includes retail location information representing a plurality of retail locations, retail category information for at least some of the plurality of the retail locations, and product information representing a plurality of products. The product information includes natural language representations of at least some of the products. Each of the natural language representations includes one or more natural language words representing the corresponding product. The database further includes a plurality of mappings between the products and retail categories represented in the retail category information. Each of the mappings represents a likelihood of a corresponding retail location in an identified retail category providing a corresponding product. One or more of the retail locations in a particular geographic area likely to provide the particular product are identified in response to a query identifying the particular product with reference to the mappings. A response to the query communicating the identified one or more retail locations is transmitted.

According to some embodiments, the database includes product ontology information representing hierarchies of product categories. This information may be used to extend the mappings to facilitate identification of the one or more retail locations.

According to some embodiments, the database includes retail category ontology information representing hierarchies of retail categories. This information may be used to extend the mappings to facilitate identification of the one or more retail locations.

According to some embodiments, the geographic area is identified with reference to geographic information received in association with the query. According to some of these, the geographic information may include one or more of a name of a geographic location, geographic coordinates, or a name of a landmark.

According to some embodiments, the query is a natural language question asking where to buy the particular product that is interpreted by the system.

According to some embodiments, the one or more retail locations are identified with reference to the product stock information identifying specific ones of the retail locations stocking specific ones of the products.

According to some embodiments, the database includes business hours information identifying business hours for specific ones of the retail locations. The one or more retail locations are identified with reference to the business hours information.

According to more specific embodiments, where a first one of the one or more retail locations and one or more of the specific retail locations having specified business hours have associated retail categories that are related, the business hours for the first retail location is inferred from the business hours associated with one or more of the specific retail locations having specified business hours.

Some embodiments of the invention operate in conjunction with a search engine. The query is received via a search interface associated with the search engine.

According to some embodiments, the response to the query communicates a real time location of a user who entered the query formatted for presentation in a mobile device interface in conjunction with representations of the one or more retail locations.

Some embodiments of the invention are implemented in a general structured knowledge and inference system. In such embodiments, the database includes data corresponding to a knowledge base and representing first knowledge about a plurality of objects using a plurality of relationships between pairs of the objects. The system is configured to generate second knowledge not represented in the knowledge base from the first knowledge by inference.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

The system described here enables customers to search for a product, and obtain a list of retail locations that are likely to provide that product without any need for any specific information about the stock or products held by that retailer.

There is no point in sending a customer to a retail location if it is currently not trading, so some embodiments of the invention are enhanced by providing information about when the retail locations are open. Again, obtaining and maintaining opening-hours information for thousands of businesses presents serious difficulties. Some embodiments of the present invention optionally combine the product and other searches by filtering the locations by those that are open at the time the query is made. They can also answer queries about the opening status or times of a specific named retail location.

In addition, as customers need to be physically present to do their business at retail locations, the search needs to confine the results to a named location, or to results near the user. For example, for searches done on a GPS-enabled mobile device the system can return appropriate retail locations near the user.

For users planning a shopping trip the following day, a search within a named city or town is possible with various embodiments.

Figure 14:
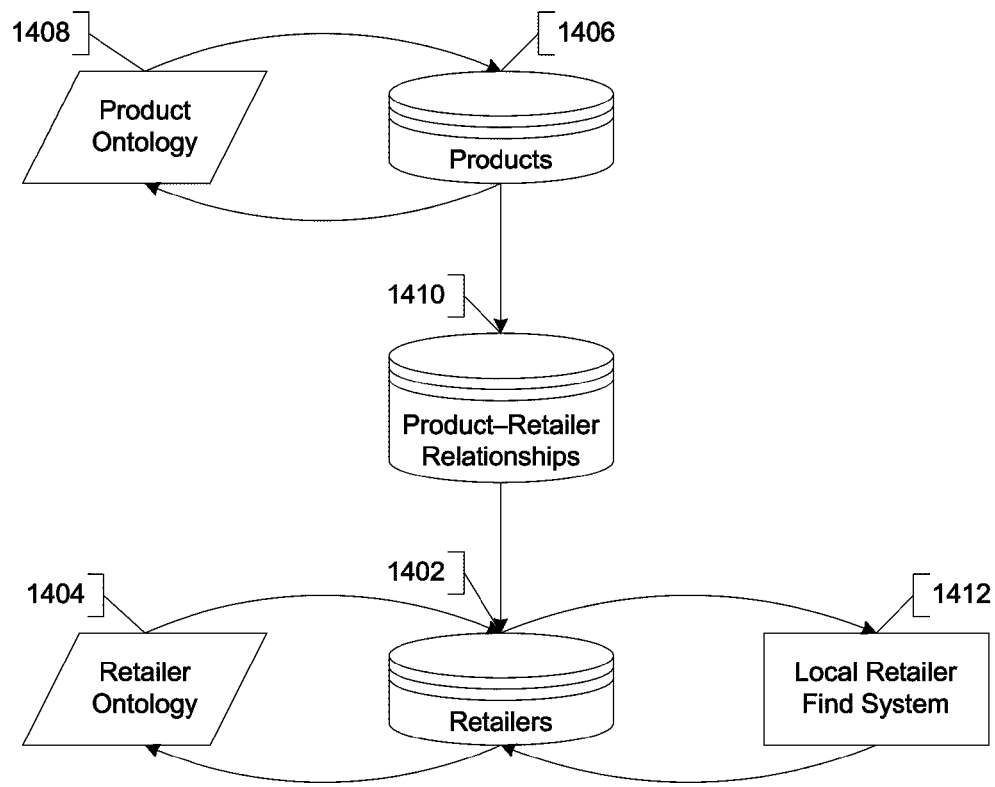
FIG. 14 shows the key components in some embodiments of the invention

Specific embodiments of the invention include the following components (illustrated in FIG. 14):
1. A database of retailers (1402), comprising:
    An identifier for the retailer.
    The retailer's name.
    The retailer's geographical location or address.
    A business class for the retailer selected from a list of possible classes (some embodiments may support multiple classes per retailer).
2. An ontology of retailers (1404) showing how retailer classes are more precise versions of other retailer classes, e.g. [chinese restaurant] is a subclass of [restaurant].
3. A database of products and product classes for each product (1406), comprising:
    An identifier for the product/product class (e.g. "[pillow]").
    Strings representing the (possibly) multiple ways of denoting that product in the supported language or languages, e.g. "pillow", "bed pillow". (Some embodiments may just have one string per product.)
4. An ontology of products (1408) showing how product identifiers are more precise versions of other products or product classes, e.g. [pillow] is a subclass of [article of bed clothing]; [puppy] is a subclass of [pet animal].
5. A database representing a plurality of relationships between products/product classes and classes of retailer (1410). The semantics of these relationships express at least one category of likelihood of members of that class of retailer stocking the named products or product classes.
6. A system capable of extracting actual retailers from the database of retailers that are in certain specified retailer classes and in an identified geographical area (or geographically proximate to a named geographical location) (1412).

Figure 15:
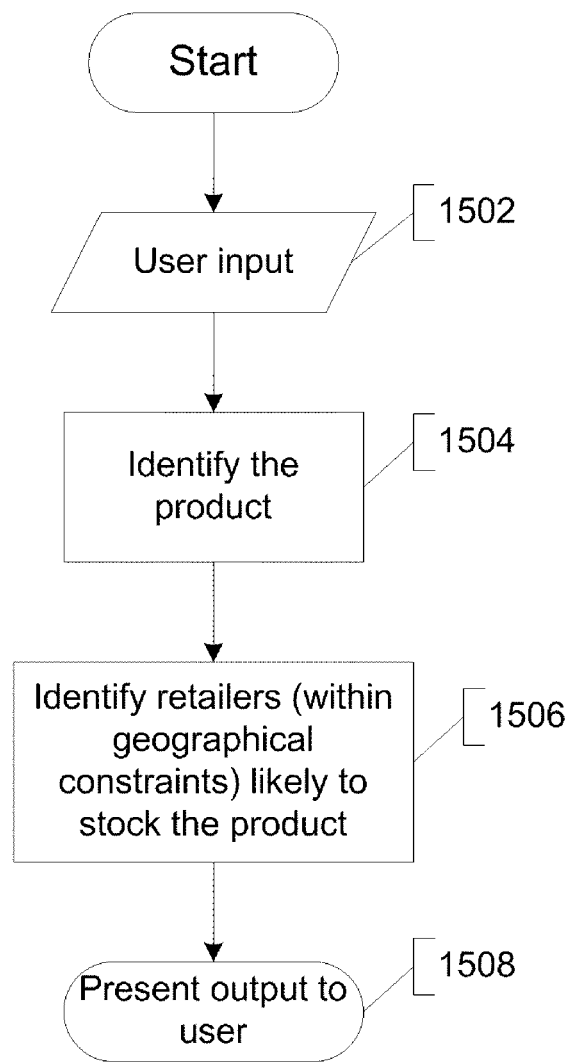
FIG. 15 shows the method used by some embodiments of the invention to turn user input into appropriate retail locations

Various embodiments of the present invention will implement the product search in the manner illustrated in FIG. 15, and described in generality here. The system takes an input from the user (step 1502) and uses the string information in the products database (1406) to turn it into identified products corresponding to that string (step 1504). It then uses (step 1506) the product ontology (1408), the retailer ontology (1404), the database of product-retailer relationships (1410), and the retailer find system (1412) to compile a list of geographically-constrained retailers that are most likely to stock that product. These results are then presented to the user (step 1508).

Examples of the relationships in 5, possible in some embodiments, are:

Pet animals are usually sold by pet stores

Articles of bed clothing are usually sold by bedroom stores

Articles of bed clothing are usually sold by department stores

DVDs are sometimes sold by book stores

Specific embodiments have two relationships: probable supplier and possible supplier. Probable supplier is for products which are almost always found in a particular type of store (e.g. shoes in a shoe store); possible supplier is for cases where the probability is somewhat lower (e.g. particular shoe type in a shoe store, or umbrella in a supermarket).

A variety of ways of implementing this should be obvious to anyone skilled in the art of software development, but specific embodiments will use the ontology to extend the rules about products and probable retail classes. For example, if the user is searching for "wellington boots", and a fact in 5 says that shoe stores sell items of footwear, and the system knows that wellington boots are items of footwear, it will infer that shoe stores are possible suppliers of wellington boots. By then using 6, an embodiment could select the actual retail locations to present to the user.

Some embodiments may contain one or more of the following additional data and features:

Knowledge about what products are stocked by specific retailers, which can be used to directly select retailers in the local area.

Knowledge about what products are stocked by all members of a chain of retailers, and knowledge about specific retailers being members of a chain. These facts together can be used to infer local retailers that are likely to stock the product.

Facts relating products to a manufacturer, and retail outlets to being dealers or outlets of the manufacturer. This in turn can be used in infer that the manufacturer's products are likely to be stocked at those locations.

Some embodiments will have a single input box, and determine whether the user has typed in a product name, a class of retailer, or a specific retailer. The input can be handled differently in each case: in the second case, showing retailers in that class in the area, and in the third case showing a specific retailer.

Some embodiments will respond to natural language questions in the class (e.g. "where can i buy a mattress in Cambridge uk", "where can i get a hamburger near the Eiffel tower?") or analogous search-engine like queries ("mattress Cambridge uk")

Various embodiments will present the results on a map.

In embodiments where a real-time location for the user is available, this will be combined with product input from the user and only locations in the vicinity of the user will be displayed In embodiments where a real-time location of the user is available (e.g. when a GPS is part of the system, perhaps embedded in a mobile device), navigational instructions to the retail locations can be included.

In embodiments supporting opening hours, an additional table of typical opening-hours regimes for various classes of retailer can be represented. After the product or retailer search has completed, the list can then be filtered to those which are likely to be open. For example, when searching for a birthday card at 8 p.m., convenience stores can be prioritised over newsagents. Other embodiments will support specific opening-hours regimes for named businesses or chains of businesses in addition to, or instead of, typical regimes for classes of retailer. In these embodiments, known opening hours for a retailer will override the best guess ones coming from a retail class.

Various specifics and alternatives to the embodiments described here will be apparent after reading the following description.

The True Knowledge Platform

Although a wide range of embodiments is possible, in specific embodiments the local product search functionality is implemented as part of the True Knowledge Platform as described, for example, in U.S. Pat. No. 7,013,308 entitled KNOWLEDGE STORAGE AND RETRIEVAL SYSTEM AND METHOD issued on Mar. 14, 2006, U.S. patent application Ser. No. 11/459,202 entitled KNOWLEDGE REPOSITORY filed on Jul. 21, 2006, and U.S. patent application Ser. No. 12/240,699 entitled ENHANCED KNOWLEDGE REPOSITORY filed on Sep. 29, 2008, the entire disclosure of each of which is incorporated herein by reference for all purposes. This section includes a description of the True Knowledge platform, together with a more detailed description of components that support specific embodiments of the present invention.

The structured knowledge representation employed by the True Knowledge system uses primarily a collection of assertions of named relationships between pairs of named entities. Each assertion (also referred to herein as a "fact") is also a named entity and temporal data about when a fact is true can be asserted using similar assertions. The system supports "negative facts": assertions of a relationship not being true, and "parametered objects" where entities are identified by a combination of a class with one or more other named entities. There is also a strong emphasis on natural language facts associating strings with each object via a relationship whose semantics corresponds to a natural language concept. These facts facilitate human interaction with the system.

The structured knowledge representation described herein is advantageous in that it allows representation of knowledge of an extremely broad class. That is, it is operable to represent any entity (including binary relationship and attributes) which can be denoted in natural language, i.e., if you can give it a name you can add it to the knowledge base with a unique recognition string which gives that entity meaning to humans. The structured knowledge representation is also operable to represent the presence or absence of any relationship between two or more such entities, and whether or not a particular attribute applies to a specific entity. The structured knowledge representation is also operable to represent points in time when these relationships are valid.

By contrast, in the typical hard-coded, database-driven application, the information represented and manipulated is of an extremely narrow domain. For such applications the developer typically creates a schema of database tables to store the entities and the relationships between entities that the application needs. The developer then hard-codes a program that manipulates the data in these tables, e.g., using SQL. Users may add data to the tables, but they can never extend what can be represented or what kinds of queries can be made.

The True Knowledge platform can enable users to almost arbitrarily extend the scope of the knowledge being represented. In fact, the scope of knowledge represented may be extended every time a new class, attribute or relationship is added.

Queries and query answering are also supported. Queries are a machine-readable analogue to a question or knowledge request designed to elicit knowledge from the system. The query answering system can answer queries with a list of objects that match the query and can answer "truth queries" (the query analogue to a yes/no question) with "yes", "no" and "unknown" responses. In some cases "completeness information" (whether the list of responses contains all the possible responses) can be provided when the query requests a list of entities.

As there are far more facts than can be stored statically, the system also supports knowledge generation. Knowledge generation enables facts to be generated by the system which are not present in the static knowledge base. This can be achieved by inference from the facts in the static knowledge base. The knowledge generation system can also generate facts sourced from a third-party database or dynamic source such as (for example) financial information.

Knowledge generation is implemented via a collection of "generators" which comprise a pattern of the facts which they can generate in combination with one or more mechanisms to generate facts which match this pattern. Some generators achieve this by providing a query linked to the pattern which if answered provides values for unknowns in the pattern thus enabling the generation of the facts ("dumb generators"). Other generators use some executable code possibly in combination with a query to generate facts matching the pattern ("smart generators"). Smart generators can be used to generate facts sourced from an external source or database by accessing this external source and converting the knowledge so retrieved into facts matching its pattern. Smart generators can also be used to do inference where at least one calculation step is needed to generate the new facts.

A form of knowledge generation is additionally supported that takes place prior to a query being executed and results in additional facts being stored in the knowledge base.

Question translation is also supported. This is the capability to translate natural-language questions or knowledge requests provided by a user into a query. In combination with the query answering system this enables internet users to type a natural language question directly into the system and obtain an answer directly. Ambiguity resolution (elimination of improbable interpretations of the question) is also supported.

In addition to use by human users, the True Knowledge platform also supports use by remote automated systems—a number of services are provided including responding to queries. As the queries and response are in structured form, this service can be of genuine use by a remote non-human user in a way that a traditional document-returning search-engine cannot.

There is also a "system assessment" component operable to assess the veracity of facts based at least on their semantic interaction with other facts in the knowledge base. Facts can be labeled as "contradicted" (in semantic conflict with other facts in the static knowledge base) and "superfluous" (believed true but which can already be generated by the system). System assessment is done on all newly added facts to the static knowledge base and the user who has added a fact that is contradicted by other facts in the static knowledge base is given an opportunity to draw attention to and potentially change the status of any of those facts which they believe to be untrue.

The True Knowledge platform supports the generation of "profiles" giving general information about a particular entity based on its class and the knowledge about that entity in the system.

As the underlying representation of knowledge is in a form separate from natural language, the platform could support user interactions with the system via multiple natural languages and with the users using different natural languages sharing access to at least some of the structured knowledge.

The platform has been implemented as a "plug-in" to existing search engines. The search-engine query entered by the user is processed by both the search engine to produce a list of documents and by True Knowledge to possibly produce a result originating from the structured-knowledge source. A successful response from the plug-in is presented above the search-engine results. If unsuccessful, the standard search-engine output is presented to the user and the user is no worse off than they would have been without the plug-in.

The following subsections describe in detail the True Knowledge platform works.

Components

Figure 1:
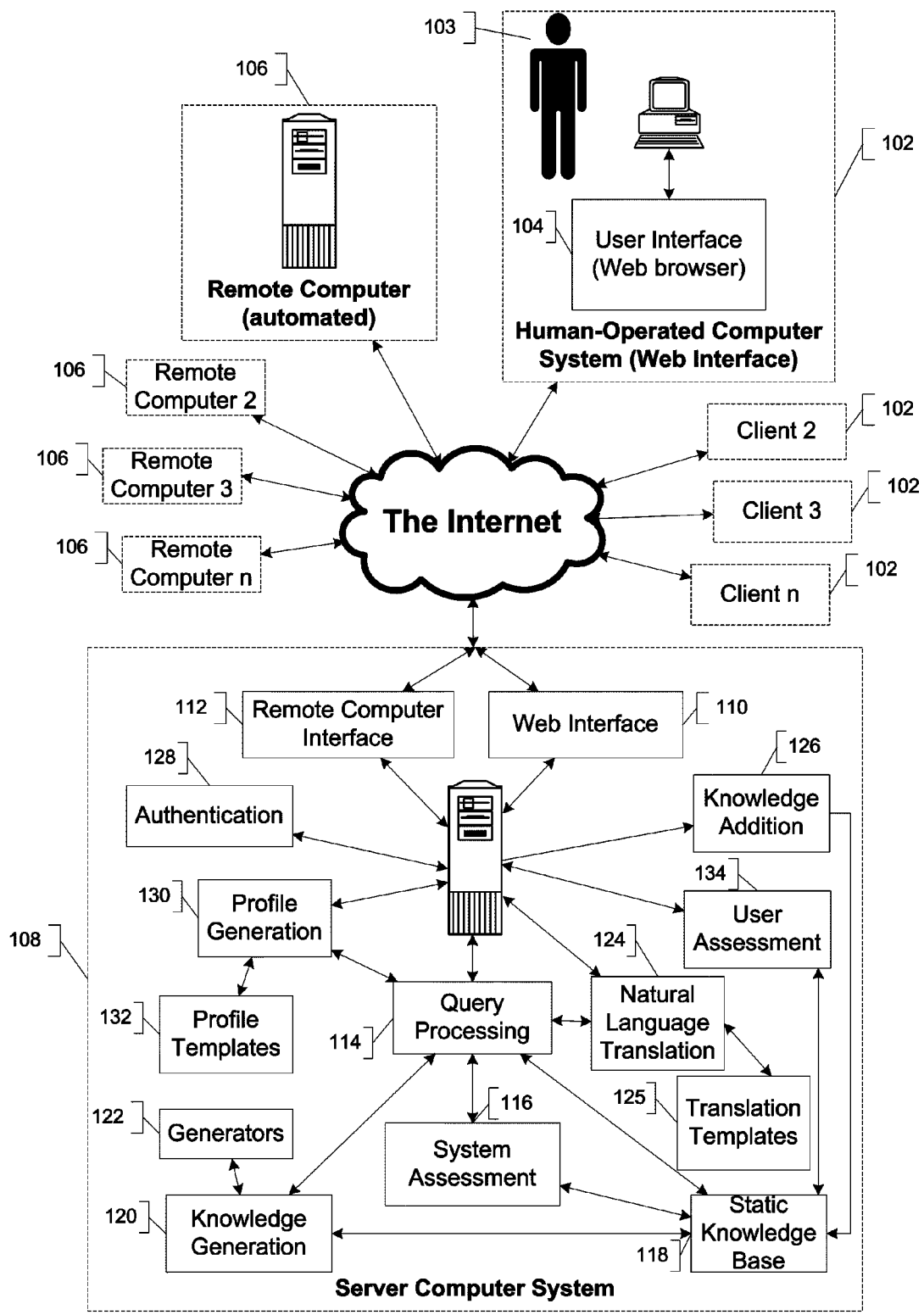
FIG. 1 illustrates components of the True Knowledge platform.

FIG. 1 shows some of the components in the True Knowledge platform. (Many of these components are optional and simply add to the overall functionality/utility of the system.)

One or more client computers (102) with a human user (103) can access the system via a web-interface (110) on at least one server (108). Additionally, one or more remote computers making automated queries (106) can access the system via a remote computer interface (112). The remote computer interface is described below.

The underlying knowledge is stored in one or more static knowledge bases (118). The static knowledge base is described elsewhere herein, and the knowledge representation method used to represent the knowledge stored in the static knowledge is described below.

Knowledge can be added to the static knowledge base by users using the knowledge addition subsystem (126). This component and its subcomponents are described below.

Users are also able to correct and endorse added knowledge via the user assessment component (134). The system is also able to analyse and label facts using system assessment (116). This is described below.

Natural-language translation (124) enables translation between natural language and internal representations (e.g. it can translate a natural-language question into a query, and natural-language assertions of knowledge into one or more corresponding facts). Translation of questions is described below. Both of these components are implemented by referring to a store of translation templates (125). These provide a pre-determined pattern for matching against natural-language strings and further data enabling natural-language strings matching the pattern to be converted to the internal representation.

Query processing (114) enables the retrieval of knowledge from the system. Queries may be the output of the natural-language translation system (124) or provided by remote computers (106). Query processing is described below.

The knowledge generation subsystem (120) provides facts which are not present in the static knowledge base often by inferring new knowledge from the facts that are present in the static knowledge base. The system uses a store of generators (122) describing patterns of fact that they are capable of generating, along with one or more mechanisms to generate these facts. Such a mechanism can be just a query (a dumb generator), or some program code optionally in combination with a query (a smart generator). Knowledge generation is described below.

The profile generation system (130) enables the creation of a collection of information about a particular object, displayed in a web page. Profile generation is achieved by use of a store of profile templates (132) which specify the knowledge to be displayed, its format, and how to obtain it.

User authentication is achieved via the authentication subsystem (128).

The Static Knowledge Base

The static knowledge base is a collection of facts represented using the knowledge representation method described below, stored in one or more relational databases on one or more server computers.

Knowledge Representation

Knowledge representation is the methodology by which knowledge in structured form is represented within at least the static knowledge base.

Methods of representing knowledge in structured form include:
  Semantic nets: graph-like representations where the nodes correspond to objects and the edges to relationships.
  Logic: a machine-readable mathematical language of predetermined syntax used to represent the knowledge. Logics are substantially simpler and more rigorously defined than natural language. Types of logic include predicate logic and propositional logic.

Frames: these represent objects as a set of slots (attributes) and associated values.

The True Knowledge platform uses primarily a combination of simple assertions asserting a named relationship between two objects to represent knowledge. The relation can be negative and certain objects can comprise one or more further objects ("parametered objects"). Each fact is also an object allowing facts to make assertions about other facts.

A detailed description of the knowledge representation used is described below:

Objects

Objects are individual entities. They can include physical objects in the real world (individual people, places, buildings etc.), conceptual objects (numbers, organisations etc.), attributes, quantities, classes etc.

All identified objects have a unique ID within the system. This name must be unique to identify the object and should correspond to a common, yet fairly specific natural-language noun or noun phrase for the same object (for relations, see description elsewhere herein; a present tense central form is used). Instances are usually given the proper name for the object if there is one. If the proper name is not unique then a noun phrase is used including the proper name. These names can include spaces making them very close to natural language. For example, [california] is the object name for the US state of California; [william jefferson clinton] is the object name for the former US president. As a last resort, one can distinguish between objects that would otherwise have been assigned the same name, by adding an integer at the end (after a space).

Note how the names are written in square brackets. This identifies the thing as an ID and also means that such names are recognizable as being True Knowledge IDs, even when written out in some context where what it is would not otherwise be obvious.

String Objects

Generally the above syntax is unrelated to the ontology used or the class of the object. One exception is the class of strings (sequences of characters). Instances of this class are simply the string itself put in quotes, e.g. ["william"] is the name for the sequence of characters 'W' . . . 'i' . . . 'l' . . . 'l' . . . 'i' . . . 'a' . . . . 'm'—it means nothing more than that. Such objects are useful for stating information used for translation and for parametered objects.

One common use of strings is to indicate denotational strings. As used herein denotational strings are strings which are used in natural language to denote an object in the system. For example, the strings "Abe Lincoln", "Abraham Lincoln" and "President Lincoln" are denotational strings for former US president Abraham Lincoln; similarly "green" is a denotational string for the attribute green.

Parametered Objects

Some classes contain an infinite (or extremely large) number of objects that can be consistently understood in some way. We can choose to denote such objects by a combination of the class name and data. The syntax of a parametered object is:

[<class name>: [object 1]; [object 2]; . . . ; [object n]]

Parametered objects have at least one object within the name as a parameter. The number of parameters can be fixed for a particular class, e.g. timepoint (a moment in time), or vary, e.g. group (a collection of objects regarded as a single object).

For some objects, strings containing the important information are used as the parameter or parameters. This is especially useful where there is already a well-established "real-world" syntax for members of the class. A simple example is the class of integers, e.g. [integer: ["8128"]]. Integers already have a universal syntax and meaning using the digits 0-9 in sequence and the decimal system. It is thus desirable to denote them using a single string object as the parameter. A more complicated but equally valid example is a chess position where a standard way of denoting it as strings (and including all the other information such as the side to move and castling rights) has already been established, e.g. [chess position: ["R7/5p1p/5Kp1/8/k6P/p1r5/2P5/8 b - -"]].

Another common class of parametered objects is the timepoint class. Here a single string object is used with a format that is not widely used. It is a sequence of integers separated by "/" characters, denoting (in order), the year, the month, the day, the hour in 24-hour clock, the minute, and the second. Any further integers are tenths, hundredths, thousandths of seconds, etc., e.g. [timepoint: ["1999/6/3/15/0"]] is 3 pm on the 3rd of June 1999 UTC. The accuracy of this timepoint is within one minute. [timepoint: ["1999"]] specifies a "moment" of time but the accuracy is one year.

Relations

Relations are relationships which link together two objects. Relationships can exist between physical objects and also between physical objects and non-physical objects (concepts), e.g. "John is married to Sarah" is a natural language assertion about a relationship between two physical objects. "The apple is green" asserts a relationship between the attribute "green" with the instance of apple being talked about. "The book is about Albert Einstein's career" asserts a relationship between a book and the concept of Albert Einstein's work history. "The soup tastes salty" asserts a relationship between the attribute "salty" with the soup. All of these natural language assertions also contain information about time (tense): this will be dealt with below.

Relationships are themselves objects. For example:

[is married to] is the object (relation) that corresponds to the Western concept of marriage between a man and woman, i.e. a formalised monogamous marriage.

[is an instance of] relates an instance object to a class object, e.g. the relationship between Albert Einstein and the class [human being].

[applies to] relates an attribute object to another object, i.e. it says that a certain property applies to something. This second object can be anything: an instance, a class, a relation or even another attribute.

[is a subclass of] relates one class to another and says that the first class is a more specific class than the second and that all objects that are members of the first class are also members of the second. For example, this relationship applies between the class [apple] and the class [fruit].

Relations are typically named by finding a present tense verb phrase that unambiguously describes the relationship.

Classes

All objects are members of at least one class. Classes define objects with similar characteristics. Class information is thus useful for generation. An object is related to a class of which it is a member by the [is an instance of] relation.

Class Structure

Classes are related by the relation [is a subclass of], so if B is a subclass of A then all objects which are members of B are also members of A. For example all members of

[human being] are members of [living thing] because [human being] is a subclass of [living thing].

Classes can also partially overlap. For example, a class could be defined of male living things which would be a subclass of [living thing] with the attribute [male]. However, members would include male human beings as well as male animals while female human beings would be excluded. Another example would be the class of (say) [blonde person] and [waren]. Classes with no member in common have the relation [is a distinct class from].

As there is a class of [object] which includes everything, the classes in the knowledge base can be considered a tree with the [object] class as the root.

Facts

Core to the knowledge representation method is the four object fact. The basic syntax is:

[name of fact]: [object 1] [object 2] [object 3]

i.e. four objects listed in order on one line, with a colon after the first one.

Object 1 and Object 3 can be of any type. Object 2 has to be a relation. This fact itself is an object with the name [name of fact]. When asserting knowledge all four objects have to be names.

The names of facts are parametered objects of the form [fact: ["<numeric ID>@network.machine.name"]]

The network machine name (e.g. an internet host name) "owns" the fact and is responsible for its truthfulness and maintaining it. This has utility for a system using a distributed model of multiple servers, each holding different facts, other machines would refer to this machine to get information about this fact if necessary.

Time

Natural language generally asserts or implies tense relative to the present. However, in the True Knowledge system static knowledge can be stored long term and we express time in absolute terms, i.e. we assert that things are true for periods or moments of time expressed as a date/time-of-day and not relative to the moment when they are expressed. Temporal data is associated with facts which assert when the facts are true.

Most simple facts have no information about time implied or represented with it. For example:

---

[fact: ["1132040@trueknowledge.com"]]: [london] [is the capital of] [the united kingdom]

--- simply asserts that the relation [is the capital of] was/is/will be true for at least one moment in the time line. It may be true for all of it, it may have been true only for an instant in 1658.

To get around this problem each fact expressing a relationship that can change can be accompanied by one or more temporal partners. Temporal partners are facts that reference other facts and make assertions about when another fact is valid, i.e. we represent the temporal data about when a fact is true with one or more further facts. For example:

---

[fact: ["2143@trueknowledge.com"]]: [alejandro toledo] [is the president of] [peru]
[fact: ["2144@trueknowledge.com"]]: [fact: ["2143@trueknowledge.com"]] [applies for timeperiod] [timeperiod: [timepoint: ["2001/7/28"]]; [iafter]]

---

[fact: ["2144@trueknowledge.com"]] makes an assertion about [fact: ["2143@trueknowledge.com"]] namely that Alejandro Toledo has been the president of Peru from the 28th of July 2001 to the indefinite future. Note that these two facts by themselves say nothing about whether or not he was president before that. (To do that requires a similar pair of facts using the negative version of the fact for the period before 28th of July 2001.)

Many facts are true for all time and it is often possible to infer this from attributes of the relation in the fact, e.g. the relation [is the biological father of] is a permanent relationship: it does not make sense for someone to cease to be someone's genetic father or to begin to be one when one was previously not. This practice of making an assertion without temporal partners is usually reserved for facts that absolutely cannot change from moment to moment—if they were true once they are always true. Generators (see description elsewhere herein) can then infer the temporal partners (if needed) asserting that they are true for the whole time line.

In addition to permanent relationships there are also permanent attributes. For example, the attributes [young] and [asleep] are examples of transient attributes. [blood group o] and [sagittarian] are examples of permanent attributes. Attributes which apply to a relationship and which are a consequence of their semantics, such as [symmetric], are permanent.

A third way of dealing with time is not to bother, and for the knowledge base only to attempt to represent information about the present (and not store information about things that were true in the past and not true now). Such an approach would require updates to the knowledge base when things change, replacing, removing or suppressing the facts that are no longer true. "True-now methodology" is the term used herein for this approach. Such a fact simply asserts something about the moment in time when the access of the knowledge base was made and it is not necessarily true at any other time. In other words the ability to assert knowledge about the past is sacrificed in exchange for benefits of convenience and efficiency. The attribute [relation is truenow] labels relations where this methodology is used. Typically when such relations appear in queries (see description elsewhere herein), the queries have no corresponding temporal partner so no inference is needed. Use of such relations in a query is equivalent to asking about whether the relationship is true now without this having to be explicitly stated.

The [timeperiod] class is a class of parametered objects where the two descriptive objects are the point in time when the period of time commenced and the point in time when it finished. However, to cover infinite or indefinite periods of time, there are three special time point objects. The first is [iafter] which indicates an unknown point in the future. It is used for things that are true at the time they were asserted but which are not guaranteed to remain true. The second and third are [time zero] and [forever] which indicate respectively a point in time infinitely long ago and a point in time in the infinite future. They are used to indicate infinite periods of time, for example the object [timeperiod: [time zero]; [forever]] indicates the entire time line and would be used, for example, in a temporal partner for facts that are true by definition. In addition to [time zero] there is a special timepoint called [earliest meaningful point], which is useful for situations where the user may not know or care about the timepoint when the relationship started but knows it was always true for as long as the fact could have been meaningful. In these situations [time zero] may be inaccurate and the alternative would be to just assert a recent time point when the user was sure the relation was true without saying it wasn't true before. An example would be asserting that the English city of Cambridge is geographically located within the English county of Cambridgeshire. Neither Cambridge nor Cambridgeshire have existed for all time but for as long as they both existed one has been located within the other. [earliest meaningful point] thus saves the user from investigating what this earliest meaningful date might be.

In summary, facts are categorised as either permanent, true-now or transient.

Permanent facts have one of the forms:

```
<anything> [is an instance of] <permanent class>
<anything> <permanent relation> <anything>
<permanent attribute> [applies to] <anything>
<anything> [applies for timeperiod] [timeperiod: <fixed start>;
<fixed end>]
```

True-now facts have one of the forms:

```
<anything> <true-now relation> <anything>
<true now attribute> [applies to] <anything>
<anything> [applies for timeperiod] [timeperiod: <anything>;
[iafter]]
```

Anything not matching one of the above patterns is considered transient.

Negative Facts

It is also possible to assert that a relationship is not true; this is done by putting the tilde ("~") character before the relation object, e.g.

```
[fact: ["3@trueknowledge.com"]]: [london] ~[is the capital of]
[england]
[fact: ["4@trueknowledge.com"]]: [fact: ["3@trueknowledge.com"]]
[applies for timeperiod] [timeperiod: [time zero]; [timepoint:
["1066"]]]
```

These two facts together assert that London was not the capital of England before some point in 1066.

When storing facts in a relational database, representing negative facts can be achieved by the addition of a Boolean field to the table storing the facts—when set true, the fact is negative.

The Golden Rule

The Golden Rule is that a relationship cannot both exist and not exist between the same pair of objects at the same moment in time. Contradictions or inconsistencies in knowledge represented by facts are produced by finding or logically generating breaches of this rule.

Note that the representation of a timepoint is imprecise no matter how accurately it is specified. In order to create a contradiction we have to show that a relationship between the same pair of objects both existed and did not exist for two overlapping periods of time implied by the accuracy of the timepoint. For example the British queen Victoria was both alive and dead (not alive) in 1901: she was alive in the part of 1901 before her death and dead in the rest of it. If someone remarries an hour after their divorce goes through they are married to two different people on the same day but without being married bigamously. If, however, you can show that someone was alive for one timeperiod and dead for another and show that the two time periods overlap, only then have you found a contradiction.

This golden rule is used to answer "no" to yes/no queries.

Queries

Queries are a machine-readable representation of a question, i.e. data which communicates to the platform what knowledge is desired from it. A number of representations are possible and the representation will often be at least partly determined by the chosen knowledge representation method. Queries look very much like a series of facts but the purpose is to see whether they can be justified from knowledge found in, or inferred from, the knowledge base rather than to assert information. Variables can also replace objects in the facts (including objects within parametered objects). For example:

```
query
    f: [abraham lincoln] [is married to] [mary todd lincoln]
    f [applies at timepoint] [timepoint: ["1859/5/3"]]
``` asks the question "Was Abraham Lincoln married to Mary Todd Lincoln on the 3rd of May 1859?".

Notice how the name of the first fact is given a variable f rather than a name. In processing the query the engine will solve for f with the fact name (if any) that asserts that relationship between Abraham Lincoln and Mary Todd Lincoln, and then try to satisfy the second line using it. Provided both lines can be satisfied with at least one value of f the query will answer "Yes".

In queries the name of a fact can be dropped when the name is unimportant, i.e. when it is not needed for a later part of the query and when it is not wanted by the user. This is effectively the same as expressing the fact name as a variable and then not referencing the variable again. Such lines thus have only three objects listed.

Variables can also be used in place of other objects in the facts. For example:

```
query a
    f: a [is married to] [abraham lincoln]
    f [applies at timepoint] [timepoint: ["1859/5/3"]]
``` asks the question "Who was married to Abraham Lincoln on the 3rd of May 1859?".

If the query is requesting objects as the answer, one or more variables that represent the desired objects follow the "query" statement in the first line. If the query is just trying to determine truth it is termed herein as a truth query and it has no variables after the "query" statement. Queries whose purpose is to produce one or more named objects as answers are termed object queries. The above query with the a missing from the query statement would ask the question "Was anyone married to Abraham Lincoln on the 3rd of May 1859?".

This simple representation means that the semantics of the query is unrelated to the order of the lines. Each line places a constraint on the value or values of each variable within the line. The collection of constraints define the information being sought and the query header specifies what variable values are the results of the query. Although the semantics of the query is unaltered by the line order, some lines may need to be processed prior to other lines in order to obtain results from the knowledge base. The query processing engine is thus free to reorder or chose to process lines in a different order should the query be presented in an order which cannot be processed.

Queryline Modifiers

The True Knowledge query language also contains certain parameters that can be added to lines in a query for efficiency and other reasons. These include:

/s which means that the current line should only be processed using static knowledge. Knowledge generation should not be userd to process the query (see description elsewhere herein). A typical situation for this is to see whether a common attribute applies. If the attribute is a fundamental property that can be assumed to be always stored statically if it applies, then there is no point in doing anything more complicated to find it, e.g. a line in a query might be: [symmetric] [applies to] r /s where r is a relation. If a relation is used, its core properties are always stored so we can assume that [symmetric] either applies or not from a static search and do not need to waste time trying to use inference to see if it holds. This parameter also enables the query to "see" superfluous facts which have been labelled as invisible.

/1 which means that only one answer need be found for this line (i.e. one substitution for the variables). Two possibilities for using this are either that the semantics of what is being asked implies there is only one answer, or that only one answer is needed. This increases the efficiency of the engine as the search can stop after the first object is found.

/e which means that the query will only be matched on static true facts which are not superfluous. One use of this parameter is to easily implement a generator for the [is a direct subclass of] relation by checking for [is a subclass] between the classes with /e. As [is a subclass of] is transitive, a static assertion of [is a subclass of] between two classes that have an intervening class will be labelled as superfluous by the system assessment component (see description elsewhere herein for details of superfluous facts). As ignoring these is part of the semantic definition of [is a direct subclass of], this is the desired behaviour.

Knowledge Generation

Far more facts exist than can be stored statically. The True Knowledge system can generate facts not asserted directly in the static knowledge base usually (but not exclusively) by referencing and inferring these new facts from facts in the static knowledge base (and possibly other generated facts). Rather than hard-coding generation rules using program code, the True Knowledge system takes a more flexible scheme by using generators. As used herein, a "generator" is a stored entity used by the knowledge generation system to generate facts not present in the static knowledge base. A generator has one or more target lines which specify a pattern for the facts that can be generated by this generator (these are termed "target lines" herein) in combination with mechanisms for generating facts that match this pattern.

In a "dumb generator" such a mechanism may simply be a query. The query gives values to the unknowns in the target line or lines and the results of the query are substituted into the target line (or lines) to generate the facts, if the query is successful.

In a "smart generator" there is some program code (termed a "tool" herein) optionally in combination with a query which is used to generate the facts. Smart generators are like dumb generators but where the footer cannot be generated simply by rewriting the results of a query: some computer code needs to be executed (run directly, or interpreted) to produce the results.

In the True Knowledge system, generators are specified as follows, in three parts:
- a title line identifying it as a generator and listing variables;
- (if present) a header query that must be run to see if the generator applies (and possibly to generate values in a dumb generator—the list of variables after the generator line);
- and a footer which is a number of facts which can potentially be generated by the generator.

(Lines Starting with "l" are Used for Comments and are Ignored by the Engine.)

A simple example of a dumb generator is the following:

```
generator a%,b%,tp
f: a% [is married to] b%
f [applies for timeperiod] tp
=>
t: b% [is married to] a% *
t [applies for timeperiod] tp
```

This asserts that if person a is married to person b for a given time period then person b is also married to person a for that same time period. This might be obvious for marriage but it would not be true for example with the relation [is a parent of].

This example is illustrative. As the system is currently implemented, the above example is actually carried out by looking for the attribute [symmetric] to the relation and having a slightly more complicated generator that only switches the two objects around if the attribute applies. This saves having to have a similar generator for every relation with this property. The generator in actual use looks like this:

```
generator a%,b%,tr
[symmetric] [applies to] r$ /s
f: a% r$ b%
f [applies for timeperiod] tr
=>
g: b% r$ a% *
g [applies for timeperiod] tr
```

Dumb generators express inferences about how, for example, the existence of a relationship implies the existence of other relationships or how the existence of an attribute can be used to infer other facts.

For efficiency reasons it is clearly not practical to run every generator that exists at every opportunity so when answering a line of a query, the query answering system first checks information stored statically (including pregenerated facts of the kind described below), and then goes on to look at generators later by matching the line of the query it is currently on with lines in the footer of the generator (i.e. it works backwards). Only the lines marked with an asterisk can be matched. If the line matches, the top of the generator is run as a query (perhaps with values substituted for variables) to see whether the bottom lines can be considered as facts. If they are, the footer facts are generated and the generated facts are added to a cache. Any objects that match variables are included in the answering of the query.

The character that ends a variable name indicates rules on what can be matched with it. Sometimes, when comparing the current line of a query with the asterisked footer line, a variable will match a variable, sometimes a named object will match a variable, and sometimes a variable will match a named object. Such matches can happen within parametered objects as well as at the top level.

The percent sign (%) after the variables in the matched line says that the variable can be either left as a variable (i.e. matched with a variable in the query line and filled by the query in the top half of the generator) or textually substituted for a name. If substituted, the variable is removed from the query statement at the top, and the object name is substituted into the header query wherever the footer variable appears.

A dollar sign ($) following the variable says that the variable must be replaced and textually substituted for a real object name from the query line being looked at—matching with other variables is not permitted and the generator will not be used if that is the kind of match found. If the variable has no percent or dollar sign it must correspond to a variable in the query line. By 'must' we mean that we cannot use the generator if the correct match is not present.

The unique fact names for the results of a generator are created automatically by the inference engine and are assigned to variables if they are needed for temporal partners (as with the above example). Facts generated by generators are also inserted into a temporary cache by the engine so they can be quickly found for use in subsequent processing of the query. This cache is checked by the engine even before searching statically-stored local facts. The cache enables facts generated in earlier parts of the query to be accessed without running the generator a second time with the same objects. By keeping a record of what generators with what parameters generated items in the cache, the engine can avoid doing the same operation twice simply by using the cache items.

As an example of a smart generator, a very commonly executed generator is the following:

```
generator tr
a$ [applies for timeperiod] tr
=> timeperiod_to_timepoint@local
a$ [applies at timepoint] tp$ *
``` which says that a relationship is true at a timepoint if the timepoint lies within a timeperiod when the relationship is true. This generator is vital as it simply is not practical to list, say, every instant when two people are married as there are an infinite number of instants in any time period. We instead statically store a period of time and if a query asks whether they are married at a given instant the above smart generator is put into action. First, all the timeperiods are gathered using the query at the top and the results passed to the timeperiod_to_timepoint tool (essentially an executable function) with the timepoint and timeperiod in question passed as parameters. If the tool determines that the timepoint lies within the timeperiod, it generates the footer with an appropriate name for the newly-generated fact, otherwise it does not. Note that it is not possible to do this directly using a dumb generator as calculation is needed to determine whether one point in time lies within a named time period.

Note also that the dollar character at the end of the tp$ variable implies that it must be matched with a named object—a named timepoint. There are an infinite number of timepoints in any timeperiod so it is only possible to check a given timepoint, not to generate all the possible answers.

Another commonly-used smart generator is the following:

```
genrator
=> now@local
[current time] [applies to] n *
``` which works out which timepoint is the current time. This smart generator does not need a query at the top (the query is null and can be thought of as always returning "yes"). The reason is that we can always be sure that there is a timepoint which is the current time. The generator just generates the footer with the system date and time as the time point whenever it is called. Naturally the current time cannot be looked up statically.

Smart generators can also be used to retrieve highly dynamic knowledge from a conventional database. For example, a smart generator could be written to return the current share price of a particular company by querying systems in the stock market. (This knowledge in turn may be used by another generator to calculate the company's market capitalization.) In this case, as with the example of the current time, the smart generator is retrieving knowledge from a third source rather than calculating from facts originating from the static knowledge base.

The computer code ("tool") that provides the intelligence to the smart generator is named according to the format name@machine.on.internet. The machine.on.internet is a named machine which owns the tool and where the code can possibly be executed remotely. The term "local" refers to the code that can be found on the local machine and/or is part of the local knowledge processing engine.

A wide variety of ways of implementing the tools and execution of the tools is possible. These include hard-coding of some of the more common tools within the engine; remote execution of code through network protocols (passing the parameters over the network and receiving the results); text scripting languages that can be downloaded from a remote machine and executed locally; other kinds of downloadable languages including those that are then executed directly on the local machine, etc.

The generator definition is stored in a relational database which is accessed by the query answering system.

Most generators only have a single target line. One exception is the following:

```
generator
=> age@local
f: a [is the age of] b$ *
f [applies at timepoint] tp$ *
``` which has two target lines to match as the age of something varies from timepoint to timepoint so the timepoint object needs to be known as well.

Query Answering

Query Modes

Queries can be run in a number of modes. Establish mode simply checks whether values can be found in the knowledge base that confirm the facts: "no" and "unknown" are thus the same result for truth queries.

Full mode attempts to distinguish between "no" and "unknown" for truth queries by seeing whether it can establish a breach of the Golden Rule for any part of the query using facts in the knowledge base, by assuming that the lines in the query are true. This test is done if it fails to answer the query with its first attempt. If it can establish a contradiction, the answer to the query is "no" because we can assume that the Golden Rule is true; if not, the answer is "unknown".

This is done in the above query-answering algorithm by adding a test after the first line of a query has failed to produce an answer. The test is designed to see whether the failure may simply be due to the knowledge base not containing the answer (an "I do not know" answer to the Yes/No question) or because it is wrong and contradicted by other knowledge in the knowledge base (a "no" answer to the Yes/No question).

Figure 2:
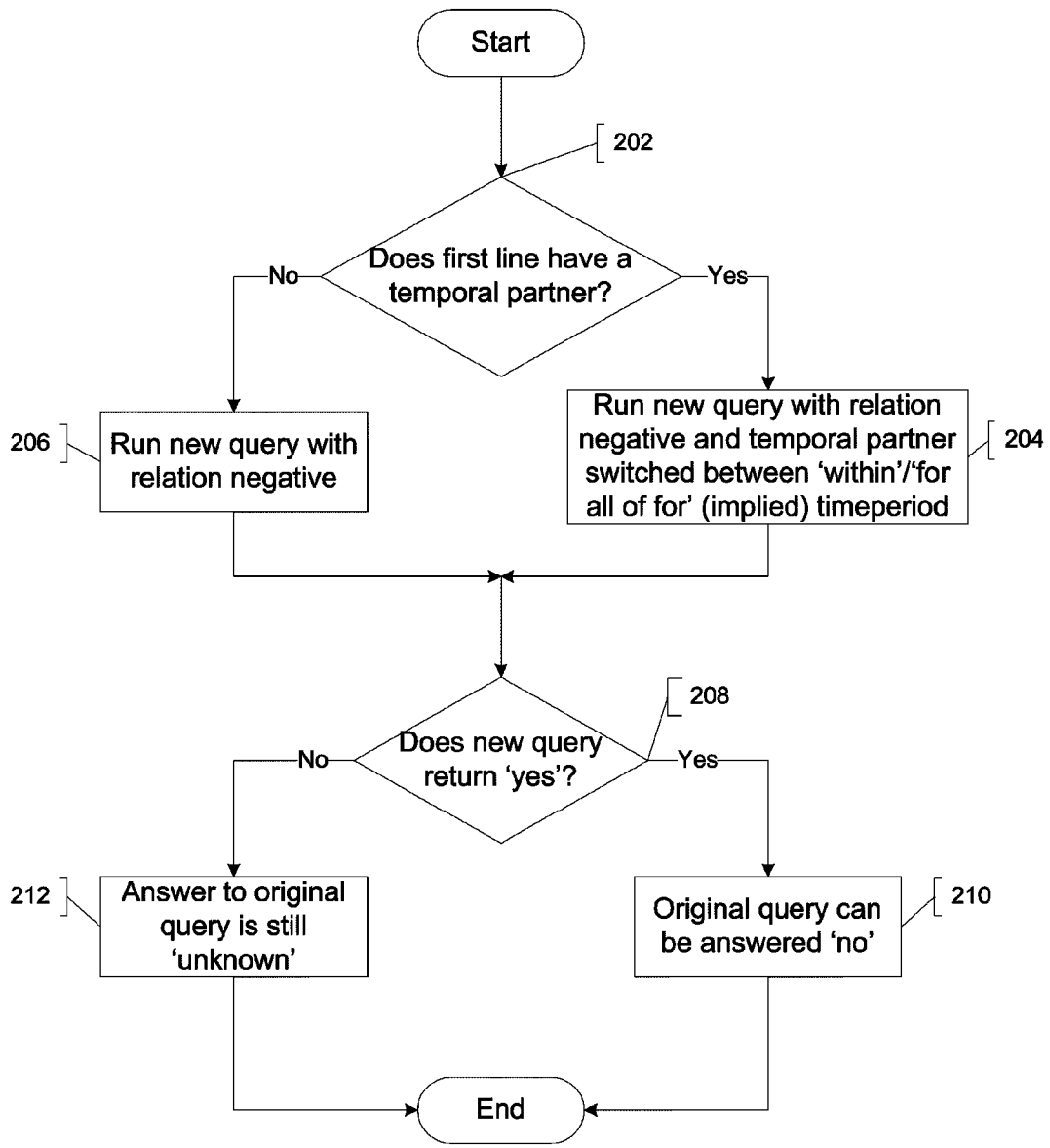
FIG. 2 shows a method for answering a True Knowledge query with "no" instead of "unknown"

The test is illustrated in FIG. 2. Step 202 involves searching for a temporal partner for the first line of the query. If there is one, step 204 is performed: creating a reverse query by making the relation negative (or positive if it is negative), and switching the semantics of the temporal partner between the concept of "within" and "for all of" for the corresponding timeperiod (or, in the case of a time point, the time period implied by the accuracy of the time point). So, the [applies at timepoint] relation is replaced by [applies for all of timepoint] relation and the [applies for timeperiod] relation is replaced by [applies for some of timeperiod] and vice versa.

In the case where there is no temporal partner (implying either a permanently true relation or one that is true at the present), step 206 is performed: the reverse query created is simply the query line with a positive relation made negative or a negative relation made positive.

The reverse query created in step 204 or 206 is then run, and the result examined (step 208). A "yes" answer to the reverse query means that the routine can answer the original query with a "no" (step 210). If the answer to the reverse query is "no", then the answer to the original query remains unknown (step 212).

For example, although it might be possible for both the facts "John is married to Sarah in 1999" and "John is not married to Sarah in 1999" to be true (if they divorced in that same year) it would not be possible for both to be true if the second statement was instead "John is not married to Sarah for all of 1999" and in this case one statement being true implies that the other is false.

Completeness

Completeness is the issue of knowing whether the answers that have been given by an object query are a complete list of all possible answers: there may or may not be answers which are not in the knowledge base. It is checked for when a query is run in full mode.

The way it is done is by storing data about how many objects exist for a template line in a query. If that number of objects is found and all subsequent filtering of them by successive lines in the query produces a definitive yes or no result we can be sure that the objects that emerge at the end of the query are a complete list.

Data about number is stored in fact pattern objects.

Fact pattern objects are parametered objects that represent a possible line in a query (excluding the fact name). Each fact pattern object, therefore, has exactly three parameters. These parameters are either the special object [object unspecified] which represents a variable or they are the names of specific objects. For example, the possible line of a query:
n [is a child of] [president james monroe]
and all similar lines with another variable are represented by the single fact pattern object:

[fact pattern: [object unspecified]; [is a child of]; [president james monroe]]

To say that President James Monroe has (has ever had) three children we then include the following fact in our knowledge base:

[fact: ["269@trueknowledge.com"]]: [fact pattern: [object unspecified]; [is a child of]; [president james monroe] ] [has order] [integer: ["3"]]

Figure 3:
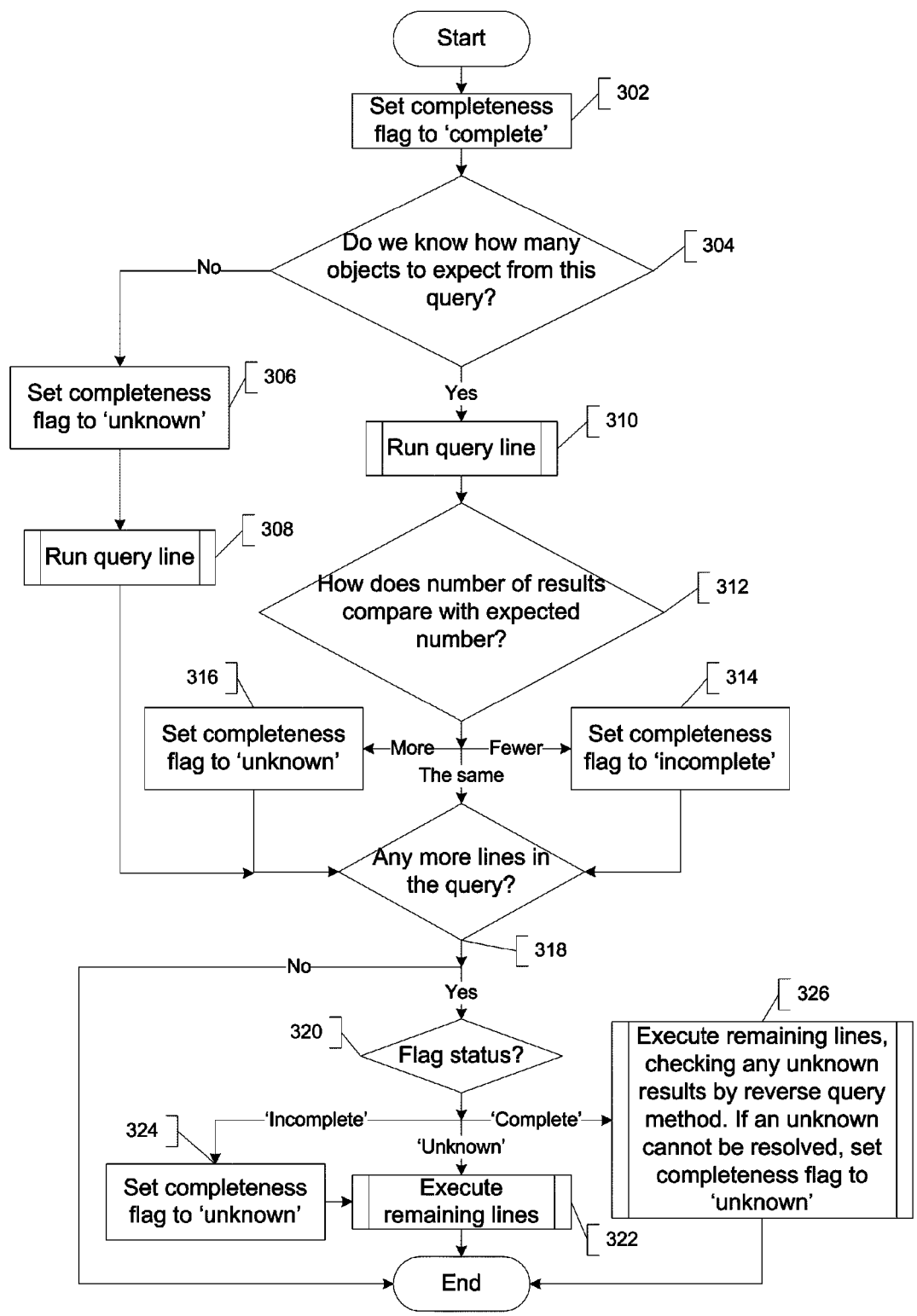
FIG. 3 shows how knowledge about the completeness of the results returned can be given in True Knowledge query processing.

When the engine comes across an object-generating line of a query (i.e. a line containing a variable that hasn't been used before), if it is asked to give completeness information to the query (i.e. if it is run in full mode), it does so by the process illustrated in FIG. 3. It starts by setting a flag indicating the completeness of the results to complete (step 302). This completeness flag can have three values meaning that the results are complete, incomplete or the completeness status is completeness unknown.

Next, it looks up whether any information is available on the number of objects known to exist for the query (step 304). It does this by converting the query to a fact pattern object and running a second query to see whether there is a [has order] fact in the knowledge base. If there is no information on the number of objects, the completeness flag is set to completeness unknown (step 306), and that line of the query is run (step 308); the flag will then stay unknown for the remainder of the query. If there is information on the number of objects, it compares the number of results found after executing the line (step 310) with the number of objects known to exist (step 312), as asserted by the fact pattern fact. If they match, the completeness status is preserved as complete. If the number of objects found is smaller than the number indicated, the flag is set to incomplete (step 314). (If larger, there is an inconsistency in the knowledge base, so the completeness is unknown, and the flag is set accordingly—step 316.)

Step 318 checks whether there are further lines in the query. If there are no further lines, the process simply returns the objects found, and the status of the completeness flag. If there are further lines, then, for as long as the completeness flag remains complete, the engine does extra work to determine whether the results it has found so far continue to be complete.

Subsequent lines in the query may filter the objects found (i.e. the line may include only a variable used to generate the objects on a previous line so when reached it substitutes the previously found objects in and only ones which can be justified survive). Before proceeding to execute subsequent lines, the completeness status is checked (step 320).

If the completeness status going into a filtering line is completeness unknown, the remaining lines of the query are executed (step 322), but no further checks on completeness will be undergone (the flag remains set to completeness unknown).

If the status is incomplete, the completeness status changes to completeness unknown afterwards no matter what the result (step 324): we do not know whether the missing objects would have passed through the filter or not without knowing what they are.

If the completeness flag is set to complete it then becomes important to do extra work if the object fails to pass through that line (step 326). If the answer can be shown as a "no" then the completeness status of the query so far is unchanged. If, however, it is unknown, then the completeness flag has to be changed to completeness unknown as well. The method used to determine between "no" and "unknown" is exactly the same as the one used to answer a truth query with "no" described above (and illustrated in FIG. 2): essentially the relation in the query line is made negative and any temporal partner is added to cover all of the timeperiod specified—if this new query is found to be true we can answer "no" to the original mini-query and preserve the status so far as complete.

Explanation of an Answer to a Query

One of the features of the True Knowledge system is the generation of a justification for its answer to a query. Such explanations are a helpful feature because they demonstrate where the answer "magically" produced came from, thus greatly improving the confidence the user has in the result. Moreover, although the results may have come from a computer, a human being ultimately has to use that knowledge and take responsibility for its accuracy.

Another advantage is that the user has a chance to see where an incorrect answer came from and do something about the incorrect fact or facts that resulted in that incorrect response.

The system is operable to produce two types of explanation: a detailed explanation which is essentially a step-by-step proof of the answer and a concise explanation designed to give the user a hint about where the result came from.

The Process_Query Routine

The semantics and syntax of True Knowledge query language, generators, and the format of knowledge in the static knowledge base is described elsewhere herein.

Facts come from three sources: (1) the static knowledge base, (2) the knowledge generation system, and (3) a cache of all facts previously discovered when processing this query. The routines that retrieve from these three sources are static_search, generator_search, and cache_search. The implementation of each is described below.

Searching the Static Knowledge Base (Static_Search)

Static facts are stored in a table in a standard relational database (the 'facts' table). The table has the objects in the fact stored in fields id, left_object, relation and right_object. Each combination of these is indexed for speed. The facts table has some additional fields, including:
- negative: a Boolean field which makes the relation negative (corresponding to the presence of the tilde '~' character when the fact is written out).
- believed_true: whether the system believes the fact is true (set by user assessment and system assessment—see below).
- visible: whether the fact is being used to answer queries. All untrue facts are invisible and some superfluous ones are also invisible.
- superfluous: whether the fact can be generated by the system anyway.
- contradicted whether the fact is in semantic conflict with other believed-true facts.
- challengeable: Boolean: whether further user assessment is allowed for this fact.

superfluous and contradicted are set by system assessment. The believed_true field is set by system assessment. System assessment is described elsewhere herein.

The parameters passed to the static_search routine are:
The queryline currently being searched.
A pointer to a list of facts into which the routine will place the static facts that match the queryline (i.e. a place to put the returned facts).
A pointer to a list of explanations to explain each fact returned.
A pointer to the query that is being processed.

When the routine is called it builds a SQL SELECT statement to retrieve the static facts from the table that may match the queryline. For objects in the queryline that are fully specified objects, this is a matter of adding an element to the WHERE part of the statement that specifies this. For example, "WHERE left_object='abraham lincoln'". The WHERE clause also needs to specify the negative field according to whether the relation in the queryline is positive or negative.

Once the SQL query has been assembled it is executed to retrieve a list of static facts. Each of these facts is then tested against the queryline if necessary to ensure it matches.

The facts that match are added to the fact list with a simple explanation added to the explanation list. The explanation consists of two lines: "I know from statically stored knowledge that" and the fact itself.

The facts and explanations are also added to the cache (if not already present). If already present, the explanation is substituted for the static one if the explanation in the cache is longer.

Searching Generated Facts (Generator_Search)

The generator_search routine receives as parameters the queryline and a pointer to a list of facts and explanations where the matching generated facts are to be placed.

In combination with the generators themselves and tool implementations it forms part of the knowledge generation subsystem.

If the queryline ends /s, generator_search simply exits; if it ends /1, it exits if or when there is one returned value.

The first thing it does is assemble a list of generators that are capable of producing facts which match the queryline provided. It does this by matching the queryline against the target lines of the generators and selecting the generators that have one that matches. Since generators can have more than one line to match, the routine may need to scan later lines in the query to match against the other target lines once the first line has been matched. A pointer to the query needs to be passed to enable this scanning.

For each matching generator it then does the following:
If there is a header query it:
Substitutes any values into the header query from the matches in the target line (if necessary).
Removes from the list of header query variables any variables in the target line which have been matched with a known object.
Calls process_query on this header collecting all the values returned.
If a smart generator, it then passes each set of values into the tool and collects the facts it generates.
If a dumb generator, it substitutes each set of values generated by the query and matches from the queryline into the footer lines to generate facts. (Any variables for the fact ID in a generated fact are given values as this is being done.)
For each of the facts generated by either method it:
Creates an explanation. This explanation is the explanation for the set of values used, generated by the processing of the header query, plus an introduction line, plus the facts generated using this set of values. For dumb generators and smart generators with a header, the introduction line is "Therefore:" and the name of the generator. For smart generators without a header query it is "By calculation:" and the name of the smart generator.
Stores the fact and explanation in the cache if it isn't already there. If it is already there, it substitutes the explanation if the newly generated explanation is shorter than the one stored.
If the fact matches the queryline, it adds the generated fact and explanation to the results list.

Searching the Cache (Cache_Search)

The cache is where facts previously found using the other two sources are stored. The cache contains the facts and the best (shortest) explanation associated with each fact.

The routine receives a queryline and a pointer to fact list and explanation list as parameters. The facts in the cache that match the queryline are to be placed in the fact list and their corresponding explanations in the explanation list. As with the other two routines, the correspondence between the explanation and fact is established by the ordering, e.g. the 5th explanation in the list corresponds to the 5th fact in the list.

It also receives a pointer to the query being processed as a parameter. This enables the routine to keep the detailed explanation a little neater by avoiding explaining the same fact twice.

The process_query routine maintains a record of all the queries that are currently being recursively processed by maintaining a pointer in the query object that points to its parent query. Child queries are queries which are being processed to provide answers for another query. That is, a child query is the query that is formed from the remaining lines of a query when the first line is resolved (see below for how this is done) or a query in the header of a generator called when processing a queryline for a parent query.

The first thing this routine does is look up the matching facts in the cache.

If it finds a match it then scans to see whether this fact has been explained before. The query object holds a 'pre-explanation' which contains the explanation for a set of values which is pending while the remainder of the lines using those values are evaluated. It also contains a standard explanation which is the partial explanation so far for the query. By scanning up the linked list of queries defined by the parent_query pointer and for each query scanning both the pre-explanation and standard explanation for matches, the cache_search routine can determine whether this fact has been explained previously. If it has been explained previously it simply creates a two line explanation for the fact. "We already know that:" and the fact. If it hasn't been explained before, it copies the entire stored explanation from the cache into the returned results.

A fast cache lookup (avoiding an exhaustive search of the stored facts) is achieved by hashing. As the queryline contains both known and unknown objects, one implementation is to hash each fact several times to enable fast lookup even with the unknowns.

Operation of Process_Query

The process_query routine receives the following parameters:
A pointer to the query to be processed.
A pointer to a list of strings used to return variable results.
A pointer to an explanation list used to return an explanation for each set of results.

The strings returned are in the form: <variable>=[object]

The number of sets of results can be determined by dividing the number of strings in the string list by the number of header variables in the query. (For truth queries no variable values are returned.)

The process_query routine also returns a status value indicating the status of the query when processing has finished.

The possible return values for truth queries are:
yes: the truth query can be satisfied.
no: It can be proven that the truth query cannot be satisfied.
unknown: It wasn't possible to establish an answer to the truth query either way.
no/unknown: For non-full mode this just means that it wasn't possible to satisfy the query and that no attempt was made to answer "no".

For queries with header variables the possible return values are:
complete: the list of values returned is all that exist.
incomplete: the list of values returned is shorter than what exists.
completeness_unknown: these are the values the system is aware of.

Both types of query can also return
error: when something goes wrong.

Figure 4:
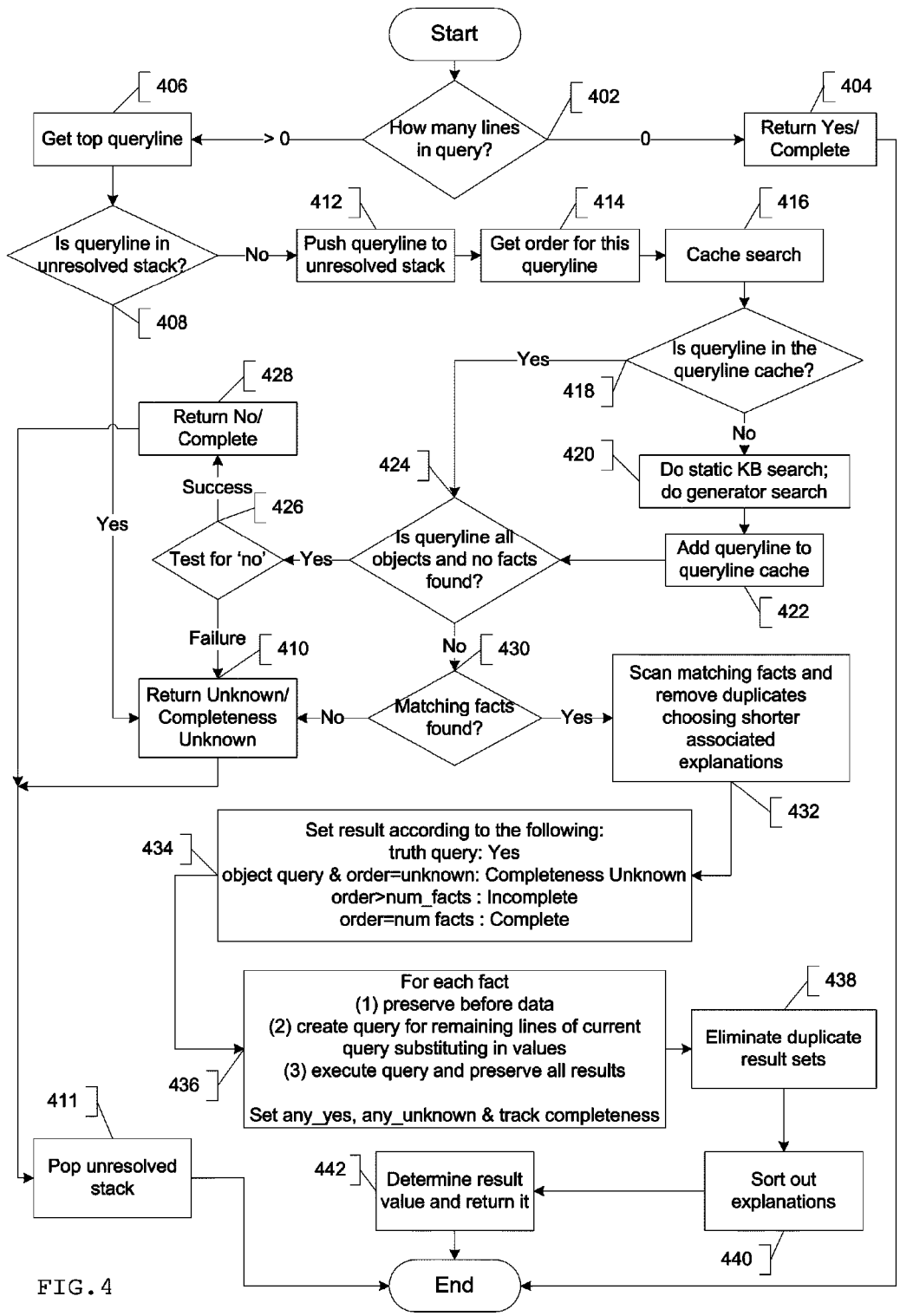
FIG. 4 shows how True Knowledge queries are processed.

FIG. 4 shows the process_query method. This figure assumes the query is being run in full mode and that explanations are being generated. (If it isn't, the steps necessary for completeness, answering 'no' and generating explanations can be skipped.)

First a check is done on the number of lines in the query (402).

If there are no lines in the query yes/complete is returned (404) and the routine ends.

Otherwise the top queryline is retrieved (406).

In order to avoid infinite loops a record of all querylines currently being recursively processed is maintained, the "unresolved stack". The first thing that is done with the queryline is to check whether it is anywhere in this stack (408).

If it is, unknown/completeness unknown is returned (410) and the routine ends. Otherwise the queryline is added to the unresolved stack (412).

An order is next obtained (if present) for this queryline (414). This is described above.

Next a search of the cache is undertaken (416). The cache_search routine is described above.

The "queryline cache" is a record of all querylines that have been successfully processed. By keeping a record of all processed querylines and storing every result matched to a queryline in a cache, the static search and generator search routines can be skipped when the queryline has been processed before, making the routine more efficient. (For this reason both the queryline cache and the fact cache must be flushed simultaneously or not at all.)

In step 418 the queryline cache is checked.

If the queryline has not been cached the static and generator searches are undertaken (step 420) and the queryline added to the queryline cache (step 422). (Either or both of these search routines may be skipped if the queryline ends /1 and a fact has already been found.)

Control then passes to step 424 which sees whether the queryline contains any variables and whether any matching facts have been found.

If there are no variables and no results, we test for "no" as described above (step 426) and return no/complete if successful (step 428) or unknown/completeness unknown if not (step 410). In either case, the queryline is removed from the unresolved stack before completion (step 411)

If there are results or variables in the queryline, control goes to step 430 where a check is made to see whether there are any facts found which match the queryline.

If there are no matching facts the routine returns unknown/completeness unknown (step 410).

If there are matching facts control passes to step 432 where duplicate facts are removed. If there are duplicate facts the one with the shortest associated explanation is the one kept.

Control then proceeds to step 434 where a provisional return result is set. If it is a truth query the provisional result is yes; if an object query and the order isn't known, the result is completeness unknown, if an order query and the number of matching facts matches the order the result is set to complete, otherwise the result is set to incomplete What remains is to process the remaining lines of the query. This is done by creating a child query for each matching fact consisting of the remaining lines with the values of the variables implied by the matching fact substituted into the remaining lines, executing each query and carefully preserving the results and explanations before and after (step 436).

Each query has an explanation called a 'pre-explanation' that is used to retain a potential part of the query's explanation should the query be successful. It is the explanation for the fact which is being substituted into the remaining lines. It is also scanned by the cache_search routine to avoid explaining the same fact twice.

Each child query has its pre-explanation explanation stored and set as the explanation for the fact being used generate it.

The header variables for each subquery are also reduced for each variable that is matched to the current fact. For example if the header query contains the variable "a" and the queryline contains an "a", the child query will no longer have "a" as a query variable as this is now satisfied in the child query.

The value sets for the header variables so far are also preserved. Once the query is processed the resulting value sets, explanations and result are also preserved.

Also within step 436 the results of each query are analysed and used to set the following values:
 any_yes: true if any of the child queries returns yes
 any_unknown: true if any of the child queries return unknown Also for object queries the provisional return result is set to complete but if any of the child queries returns completeness_unknown, the return result is set to match.

At the end of step 426 we now have for each matching fact:
 a preexplanation of the fact.
 a set of results for the corresponding query and an explanation for each set.
 a return value for the query
 a set of header variable values that were determined from the first line (possibly null)
 Success of a child query is defined as follows:
 an object query returning >0 results
 a truth query returning yes
 a truth query returning no when current query is a truth query and all other child queries have returned no as well.

In step 438 all duplicate sets of results are eliminated from those that succeeded. When duplicates are located, the result that is retained is the one with the shortest explanation.

Control then passes to step 440 where the explanations are taken care of. This is done by merging the preexplanation for the fact with the explanation returned by the query that returned the results. This combined explanation is appended to the explanation for the main query and associated with the returned result set by adding it and the result set to the lists passed as parameters to the process_query call.

The final step is step 442 where the return result is calculated and returned.

For a truth query the return result is 'no' if all the child queries returned 'no', 'yes' if any_yes is set and 'unknown' otherwise.

For an object query the return result is 'completeness unknown' if any_unknown is true, otherwise it is the result set provisionally in step 434.

Translation

Translation is the art of converting the structured knowledge and associated entities in the system into and out of natural language.

Denotational Strings

A key concept in the True Knowledge system is the 'denotational string'. Denotational strings are strings in a specific natural language that denote objects in the knowledge base. They are linked to their corresponding objects via facts. These facts can be stored statically or in some cases generated by the knowledge generation system.

For example, the facts

["abe lincoln"] [can denote] [abraham lincoln]
["president lincoln"] [can denote] [abraham lincoln]

provide a link between two ways of identifying the famous former US president in natural language and the internal ID.

Generators can also be used to generate denotational strings. For example, the following generator enables timepoints to be parsed:

generator
=> timepoint_parser@local
s$ [can denote] [timepoint: a%] *

The tool timepoint_parser receives the string s$ (and a % if specified) and sees whether s$ corresponds to any of the various formats that we use to specify points in time. If the string can denote one or more points in time the corresponding facts are generated (after comparing to see if they match a % in the unlikely event that a % is specified).

This generator can generate facts like:

["the 3rd of January 1992"] [can denote] [timepoint: ["1992/1/3"]]
["June 1732"] [can denote] [timepoint: ["1732/6"]]

Similar generators can be written for integers and various parametered classes.

Other Languages

The examples given so far are all English language. However the True Knowledge platform can also be extended to support other natural languages.

There are several thousand living languages used throughout the world and it would be desirable to provide support for multiple languages. As the underlying knowledge representation method is distinct from natural language (unlike document-based systems) this support can allow access to at least some of the same underlying facts to users communicating in multiple natural languages.

To create support for other languages one can first create analogous relations to those described herein for English, for each of the languages that one wishes to support.

For example, to support the concept of denotational strings in the French language one can add a relation analogous to the English language [can denote] relation, e.g. ["pays"] [can denote in french] [nation state]
or to support many languages consistently, a parametered relation could be used, e.g.

["maa"] [can denote: [finnish]] [nation state]
["pays"] [can denote: [french]] [nation state]
["gwlad"] [can denote: [welsh]] [nation state]
["país"] [can denote: [spanish]] [nation state]

Similar analogous relations are needed for [commonly translates as] and [uniquely translates as].

Support is also needed for grammatical data associated with the desired language and this grammatical data could desirably be prompted for at an appropriate time in the appropriate add knowledge process (see description elsewhere herein).

For example, unlike English, many Indo-European and other languages associate a grammatical gender with at least some nouns and knowledge of this gender is necessary to produce grammatically correct productions of the language.

In summary, to support other languages requires following the principles described herein to represent any language-specific translation and grammatical knowledge and if necessary, to prompt for it during the appropriate add knowledge processes. This knowledge is then available for translation when the system is interacting with a speaker of the target language. Translation routines and templates for the language also need creating, again following the principles described herein but adjusted according to the properties of the target language.

Question Translation

Translation of natural language questions into queries is achieved by the use of 'translation templates'. Translation templates contain a pattern which natural language can be matched against in combination with a description of how to translate natural language that matches that pattern into the target entity.

This technique can translate questions into queries. The True Knowledge system can also translate natural-language assertions of knowledge into facts. Other techniques resolve some ambiguity issues.

As used herein, the term "question" refers to any sequence of words in natural language the purpose of which is to solicit knowledge from the system. It need not necessarily conform to the classic grammatical definition of a question. For example, it could be in imperative form such as "Tell me what the capital of France is" or the meaning could be implied.

A translation template contains:
A pattern: a sequence of known and unknown strings using variables for the unknown strings.
A header query which generates results for the translation and possibly does other consistency checks on the strings.
A footer which is the result of the translation of the natural language text after values have been substituted in. This is a query when translating questions.
An example translation template is:

"what is"/"what's" a b
—
query c,d
a [is an attribute form of] c
b [can denote] d
—
query e
[current time] [applies to] now
f: e c d
f [applies at timepoint] now The top line is the pattern for the template. Any sequence of three recognised strings where the first is "What is" or "What's" will be matched with this line, and the query at the top run to see if it produces results.

For example, if "What is the capital of France?" is asked as a question the engine will first attempt to recursively break this up into a sequence of recognized strings. This is achieved with a function which returns all sequences of recognised sequences of one or more words in the string passed to it. The function achieves this by scanning the string from left to right. When a word boundary is found the currently scanned sequence of words is examined to see whether it is a recognised word or phrase. This can be done by searching for the string in the knowledge base.

This search for the string in the knowledge base is done with two checks. The first to see if it is labelled as being part of a translation template, and the second check is to see if it is a recognized denotational string within the system (either statically or by generation).

If it is recognised, it recursively calls itself with the remainder of the string and adds the scanned string to the start of each sequence returned. Recognised strings can be hashed to save having to check whether they are recognised more than once.

For this example, one of the recognised sequences returned by this function will be: "What is" "the capital of" "France".

"the capital of" will then be textually substituted into the header query for a and "France" will then be textually substituted into the query for b. The header query will then read:

query c,d
["the capital of"] [is an attribute form of] c
["France"] [can denote] d which when run will return the results c=[is the capital city of] and d=[the nation state france].

The footer query can then be run and the results will then be substituted into the bottom query as the correct translation of the question:

query e
[current time] [applies to] now
f: e [is the capital city of] [the nation state france]
f [applies at timepoint] now This query is the correct (and only) translation of the natural-language question. After execution the engine will answer the question with the answer "The French city of Paris".

Figure 5:
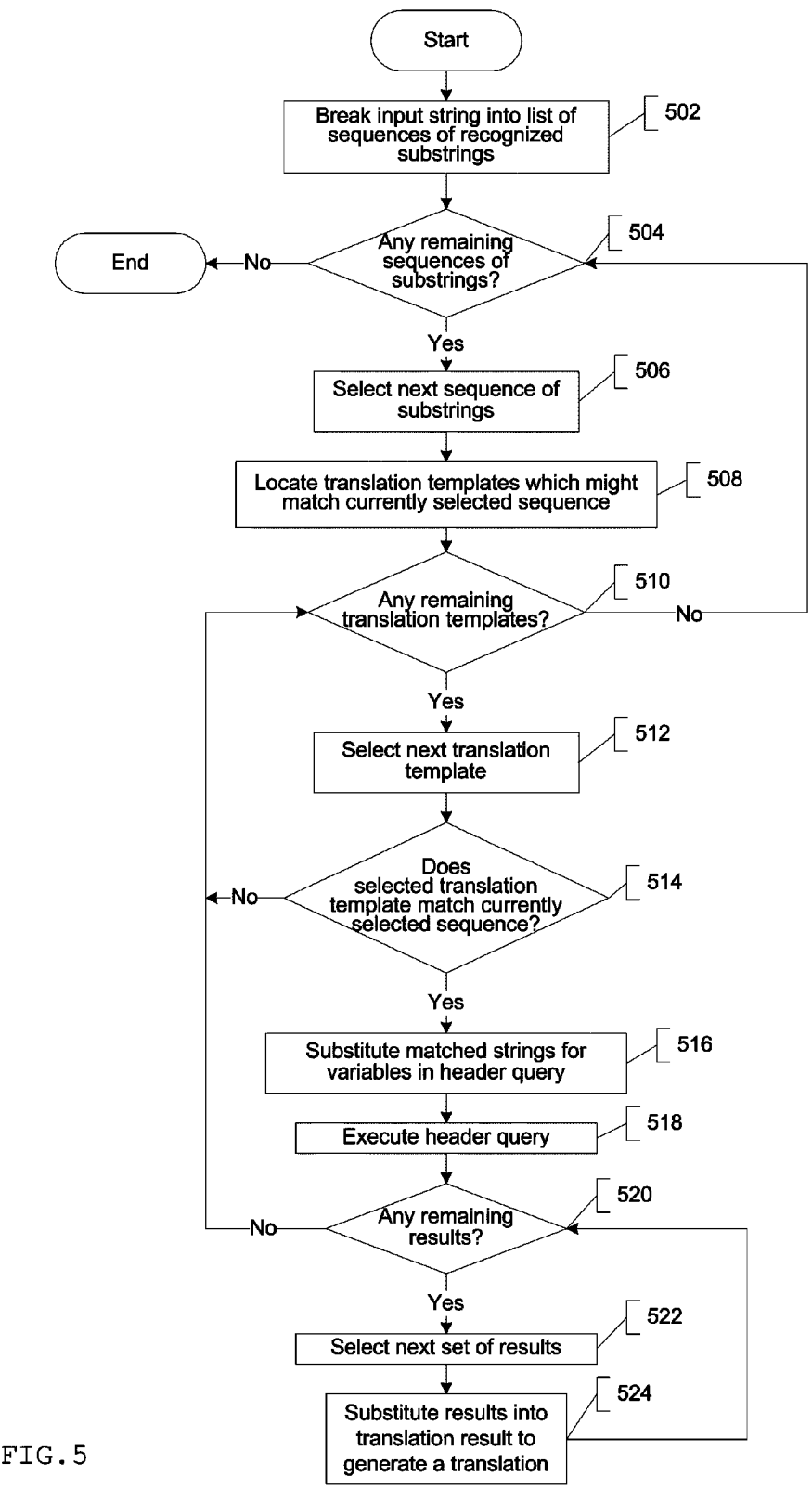
FIG. 5 shows a method in the True Knowledge platform for translating a question or fact assertion from natural language into internal form.

FIG. 5 shows the method of translating an item of natural language using translation templates.

Step 502 is to break the natural language question into sequences of recognised substrings. Step 504 checks to see whether there are any unprocessed sequences left, and ends the process if there are no more (or none to start with). If there are sequences still to be examined, the next one is selected (step 506) and all translation templates that might translate this sequence are then looked up (step 508).

Step 510 checks to see whether any of these possible translation templates remain and returns to step 504 if not, otherwise it proceeds to step 512 where the next unprocessed translation template is selected. Next, the current translation template is compared with the current sequence of strings (step 514), and if they do not match then control is passed back to step 510. (These steps ensure that every sequence is matched with every possible translation template that might match.) If they do match, step 516 is then done, and substitutions are created between the variables in the template representing unspecified strings and the strings that actually appear in the sequence. These string objects are substituted for those variables in the header query. Step 518 which executes the query is then done. Step 520 sees whether any results from this query are still to be processed and if so it selects the next set (step 522) and substitutes the results into the translation query to produce a possible translation (step 524). If not, it returns control to step 510.

Translation templates can also contain fields which helps the system translate the question or fact assertion back into natural language. Translating back into natural language has value in demonstrating to the user that the system has correctly understood the question asked. In cases where the question is ambiguous, it also has value in enabling the system to list various alternative understandings of the question asked so that the user can select the one intended.

The fields are a sequence of natural language strings and variables resolved by the queries in the template. To translate the question back into natural language the system translates the objects into natural language and outputs the sequence of pre-determined strings and translations to generate a translation of the entire question. The variables are all generated by a further query (retranslation query) which generates string objects from variables and objects resolved with the other queries in the translation. These string objects are the ones referenced in the translation sequence.

Resolving Ambiguity

Ambiguity is where the natural language has more than one potential translation. Ambiguity can sometimes be resolved from other information in the knowledge base. As used herein "semantic constraint knowledge" is knowledge about the meaning/use of objects in the knowledge base which limits how they are used by any entity that understands the object's meaning.

If more than one translation remains after use of semantic constraint knowledge then the engine can resolve ambiguity as a last resort by asking the user for more information. It does this by translating the queries back into English and listing them on the screen. The user then selects the query that he or she intended to ask. Although individual words and phrases translating into multiple objects are a common cause of ambiguity, different translations may also come from different translation templates.

Examples of semantic constraint knowledge now follow:

Left and Right Classes of a Relation

The left and right classes are properties of a relation that constitute a form of semantic constraint knowledge.

Example assertions of left and right class are:

| [geographical area] [is the left class of] [is the birthplace of] |
| [geographical area] [is the right class of] [is the capital of] |

This knowledge conveys the largest class of objects that can reasonably be used with this relation. To put it another way, any intelligent entity wanting to enquire about the existence or non-existence of a relation would not do so with objects outside these classes. (As this is the case, the issue of whether the relation can apply to objects outside these classes is believed to be moot in practical use.)

All queries generated by the translation process can be subjected to type checks using such knowledge. Any line with the relation [is the capital of] would be subjected to checks on its right object. If it turned out that the right object was not an instance of [geographical area] the translation would be rejected.

Semantic Scope of Attributes

Another related way that interpretations can be eliminated is to define a class which defines the scope of an attribute.

Attributes are shown to apply to objects using the relation [applies to], e.g.:
[unmarried] [applies to] [james buchanan]

Like left and right classes of a relation, attributes can also have a class associated with them:
[human being] [defines the scope of] [unmarried]

Like left and right classes of a relation, the scope of an attribute is defined by the semantics of the concept the attribute represents and thus provides a sanity check on any interpretation where the object is outside this scope.

Knowledge Addition

Knowledge addition refers to the techniques by which knowledge may be added to the system by users.

As the True Knowledge platform is directed towards general internet users adding to the system, there is no guarantee that the knowledge being added is correct or not added maliciously. Furthermore, most of these general internet users will not be technically minded or familiar with the underlying technology.

The platform is designed to enable almost everything needed to make the system produce and display knowledge to be added to by general users including the addition of individual objects, relations, classes and attributes; the assertion of facts; and the addition of profile templates, generators, tools and translation templates.

For object addition and fact assertion the platform uses a natural-language based, interrogative approach, interacting with the user by asking natural language questions and obtaining input from the user in response, often in an extended sequence. Natural-language presentations of the facts gathered from the interaction can also be shown to the user for confirmation. The knowledge addition subsystem can be considered as a natural-language interrogation system designed to collect real-world knowledge from human users for addition to the static knowledge base in structured form.

Users interact with at least one remote server by feeding input into a local client computer. An interface is provided to the user at the user's computer which transmits data determined by the actions of the user (e.g. entering natural-language text, clicking buttons) to the remote server. Prompts and other responses relating to activity at the server computer are presented to the user on the computer screen at the user's location. Despite the possible large geographic distance between the user and the remote server, knowledge addition and other valuable activities involving users are thus facilitated by actions such as providing interfaces and presenting responses which take place locally to the user.

The interface comprises one or more web pages specified in HTML containing form elements. The web-browser on the local client computer displays the web page containing instructions and form elements and actions by the user result in data being transmitted using HTTP over the internet back to the remote web server.

System Assessment

As used herein "system assessment" is the automated analysis of a fact to determine its veracity using at least whether the fact is semantically contradicted by other knowledge in (or known to) the system.

The system also determines whether a fact is superfluous, i.e. whether it can be generated by the system anyway. System assessment might also mark a fact as being invalid (nonsensical rather than believed or contradicted, e.g. a fact that an object is an instance of Africa, which makes no sense given that Africa is a place and not a class.

As used herein "interactivity information" is data about how the fact interacts semantically with other facts in the system: whether a fact is contradicted or rendered superfluous by other facts in the knowledge base. A fact which is contradicted is in semantic conflict with one or more other believed-true facts in the system. A fact which is superfluous can already be produced by the system. A fact which is "uninfluenced" is neither contradicted nor superfluous and thus adds to the total knowledge of the system.

System assessment helps to keep the facts in the static knowledge base consistent with each other and is also another weapon to counter abusive or accidental assertion of untrue facts by users.

To generate interactivity information for a single fact the system assessment component creates a truth query in full mode corresponding to the fact.

If the fact being assessed is already in the static knowledge base it also tells the query answering system to ignore it when answering this query. Alternatively, the fact can be temporarily suppressed or removed from the static knowledge base while it is being system assessed.

The query is then executed. If the result is "no", the fact is contradicted. If the result is "yes" the fact is superfluous. If the result is "unknown" the fact is uninfluenced.

The static facts used in answering the query together are the ones which render the fact contradicted or superfluous and are termed "influencing facts" herein.

When the system assessment is done in the course of a user interaction these influencing facts are displayed to the user and an opportunity can be given for them to contradict any they disagree with.

Pregeneration of Static Facts

Various methods were described above to generate needed knowledge primarily in response to the execution of a query.

The system can additionally generate facts prior to the execution of a query and store these facts in the knowledge base.

Such 'pregeneration' enables faster responses to queries in some circumstances by preventing the need for the fact to be generated as part of the query processing.

Additionally, it may enable some queries to be answered using a join of two or more lines where all the necessary facts have been pregenerated.

Pregeneration is implemented as follows:

Pregeneration Rules

Pregeneration rules embody which facts are pregenerated and in what circumstances. These are like generators but are used to specify the creation of superfluous static facts as part of the pregeneration process rather than facts which are generated dynamically as part of query processing. Pregenerators comprise at least a trigger line, which is a pattern to be matched against static facts, a header query which tests and provides values, and a footer which contains one or more facts which can be pregenerated.

An example pregeneration rule is as follows:

f: x [is an occupation of] y query tp
f [applies for timeperiod] tp
=>
f2: x [is an instance of] y
f2 [applies for timeperiod] tp This example generates static [is an instance of] facts to sit alongside facts where an occupation is asserted. It is useful in a knowledge representation where occupations are also subclasses of [human being].

The trigger line is part of the pregenerator that specifies when the rule should be used. In this case it is the existence of a static fact with [is an occupation of] as the relation.

The variables in the trigger line are substituted for the entities actually present in the static fact and the header query is then done. So if the static fact was:

[fact: ["2312348@trueknowledge.com"]]: [singer] [is an occupation of] [jennifer lopez]

The header query would be query tp
[fact: ["2312348@trueknowledge.com"]] [applies for timeperiod] tp This would return a value for tp of the $1^{st}$ of June 1999 onwards so the pregenerated facts would then be:

f2: [jennifer lopez] [is an instance of] [singer]
f2 [applies for timeperiod] [timeperiod: [timepoint: ["1999/6/1"]]; [iafter]]

which would go into the static knowledge base (with a suitable ID substituted for f2).

Implementation of Pregeneration

Pregenerated static facts are labelled as such via a database flag and are treated differently from other static facts. Pregeneration is an additional function of system assessment.

System assessment without pregeneration is described elsewhere herein; the additional steps described below are taken to create pregenerated facts and manage them.

The first additional step is that after system assessing a fact as believed true, it is matched against all trigger lines of all the pregeneration rules and the resulting pregenerated facts (where they don't exist already) are added to the knowledge base, labelled as pregenerated. This step is only done when system assessing static facts which are not pregenerated. When pregenerated facts are created, the related_facts table should be updated to show what facts the pregenerated fact has been inferred from. This can be achieved by simply system assessing each pregenerated fact immediately after creating it.

Secondly, when a pregenerated fact is system assessed as anything other than true and superfluous it is erased from the knowledge base. Pregenerated facts are by definition true and superfluous and this implementation relies on ensuring pregeneration rules match dynamic inference rules (generators) even if those rules, for efficiency, are only used during system assessment (system assessment only generators).

When a static fact on which one or more pregenerated facts relies changes state from believed true to believed false, the existing system assessment process of immediately system assessing facts that the related_facts table says are generated from this fact will thus result in these facts being immediately removed if they can no longer be supported.

Figure 6:
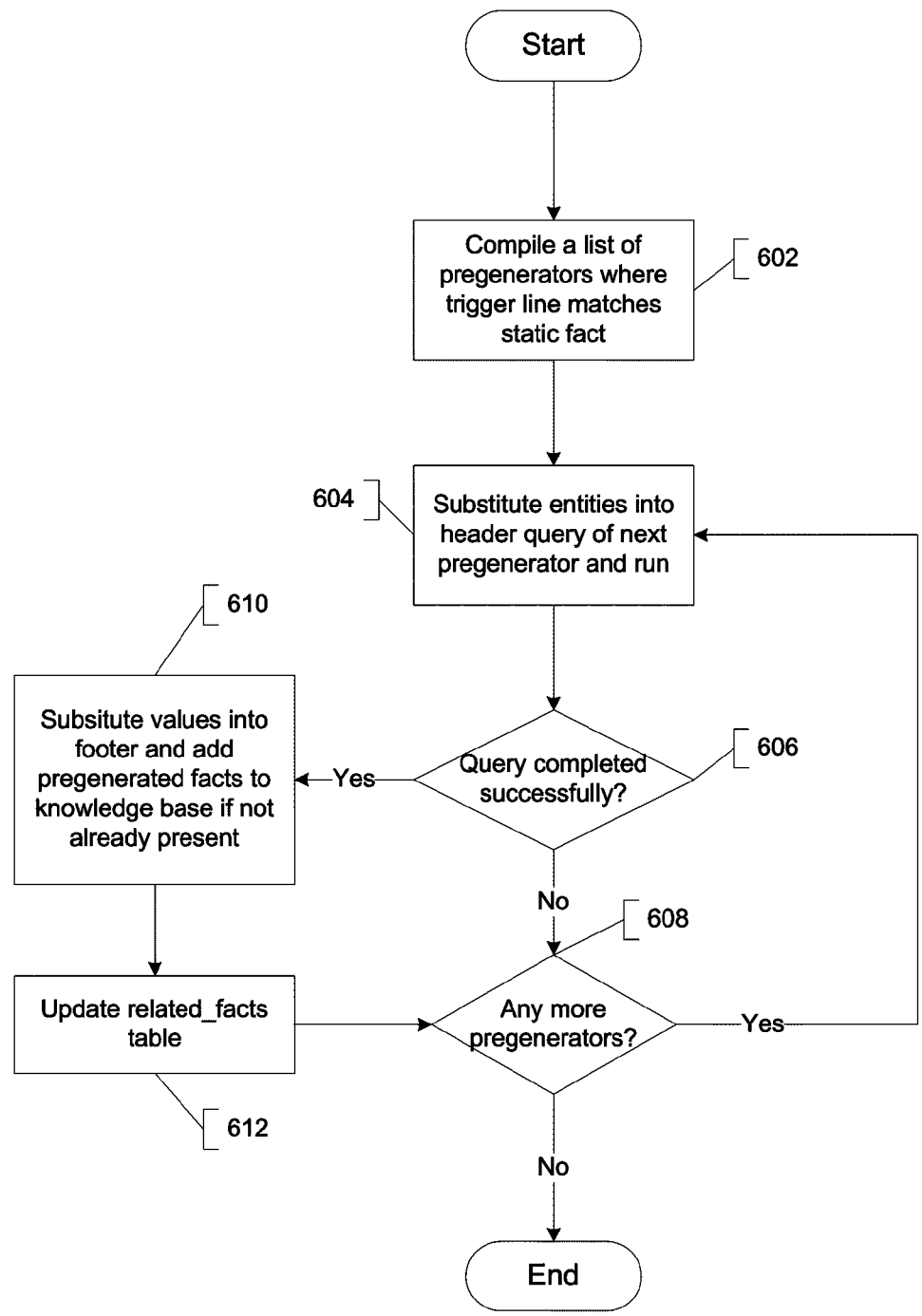
FIG. 6 shows a method for populating a knowledge base with additional true facts inferred from others.

The method for creating pregenerated facts after system assessment has assessed a non-pregenerated fact as believed true is shown in FIG. 6.

The first step is to match the static fact against the trigger lines of the pregenerators and create a list (602). This list is then looped through.

At the start of the loop, the next pregenerator header query is prepared by substituting in the values created by matching the static fact to the variables in the trigger line. This query is then executed (604).

A test is done to see if the query executed successfully (606). If it didn't, the loop continues, ending if all the pregenerators have been tried (608), otherwise any results of the query and any other variable substitutions from matching the static fact with the trigger line are substituted into the footer facts to create the pregenerated facts, which are then added to (if not already present in) the knowledge base (610).

Next, the related_facts table is updated so that the static facts on which the pregenerated facts rely are recorded (612). This can be achieved by system assessing the pre-generated facts.

Remote Computer Interface

The True Knowledge platform can be accessed by remote computers. As it is able to produce knowledge in structured form, services provided, especially query answering, have the potential to be substantially more useful to a remote automated system than natural-language documents returned by a search engine which are designed for (and only really useful for) human eyes.

The platform is operable to provide several services to remote automated systems including query answering (as described above) and translation (as described above). By providing a variety of services, some components (such as the knowledge addition component) can be located on remote systems on the network and use the remote computer interface to interact with other components.

The platform is operable to receive the request data via an HTTP (or HTTPS) request where the request data is encoded using HTTP request variables. It responds (again using HTTP) with an XML document matching a pre-determined XML schema.

Implementation on the True Knowledge Platform

The following describes how to implement embodiments of the invention on the True Knowledge platform.

It includes how to represent knowledge about opening hours for businesses, how to provide information about businesses with the required properties that are within a fixed radius of a place, and how to decide which businesses are likely to provide which products.

Implementation on the True Knowledge platform means that natural-language questions about local retailers and their products and opening hours can then be responded to. Typical questions that will be answered by the technology described below are "Is John Lewis open now?" and "Where can I buy a kettle within 1 mile of the Grand Hotel?".

In addition, the True Knowledge queries corresponding to these questions can be made by an application wanting to implement this functionality. Example applications include a web page showing a map with the locations, or a location-aware mobile device supplying knowledge of the user's current real-time location.

Opening Hours

In summary, every business has an opening hours regime that contains all the information about its regular hours of business. Specific closing times, such as when the proprietor is taken ill, can be added separately.

Opening Hours Regime Objects

According to a specific embodiment, an opening hours regime is modelled as a list of classes of day, e.g. 'weekday' and 'UK bank holiday', together with a list of times when an opening or closing action is performed for each of those days. These are represented with a parametered object [opening hour regime] (see description of parametered objects above).

If a class of days appears early in the list, then the facts about the actions on that day will override any facts about days later in the list.

The list of actions are stored as a colon-separated string. Each action is given as either 'T' (for 'trading') or 'C' (for 'closing') followed by a four-digit number representing the time of day when this action takes place. If a business is closed or open for the whole of one of the days, then a 'T' or a 'C' with no timepoint part is used.

'0000' denotes "midnight at the start of the day" and '2400' denoted for "midnight at the end of the day". For example, a typical opening hours regime for a shop could be:

```
[opening hour regime: [holiday by date within trading day:
[england and wales]]; [sunday]; [saturday]; [weekday];
["C:C:T1000C1600:T0900C1700"]]
```

This is interpreted as meaning "the shop is closed every Sunday and Bank Holiday; on Saturdays it is open from 10 a.m. to 4 p.m.; and the weekday hours are 9 a.m. to 5 p.m.". Note that the Bank Holiday hours override those for a typical Monday.

Specific closing times are handled outside the regimes. They are asserted with a static fact like this:
<timeperiod>[is a specific closing period for]<business>
For example:

```
[timeperiod: [timepoint: ["2008/12/27"]]; [timepoint:
["2008/12/31"]]] [is a specific closing period for] [john lewis
cambridge]
```

Allocating a Regime to a Business
Static Facts:

The simplest way to allocate a regime to a business is to assert a static fact of the form

```
<opening regime> [is the opening regime for the business]
<business>
```

Specific Facts about Classes

Sometimes all businesses in a class are known to share a common opening hours regime. For example, all branches of the pub chain AnyPub might share the same hours. In this case facts about the whole class can be asserted thus:

```
<opening hour regime> [is the opening regime for the class]
<class>
```

The regime for a particular business can be generated from the regime for its parent class using this generator (see description relating to generators):

```
generator reg%, tp
g1: business$ [is an instance of] c
g2: reg% [is the opening regime for the class] c
g1 [applies for timeperiod] tp1
g2 [applies for timeperiod] tp2
tp [is the timeperiod intersection of] [group: tp1; tp2]
=>
f: reg% [is the opening regime for the business] business$ *
f [applies for timeperiod] tp
```

Default Regimes for Classes

If we have no information about the opening hours regime for a business, and nothing definite known about all the members of a class containing it, then we can often guess when it is likely to be open or shut from facts about its class. For example, it would be reasonable to assume that a pub will be open at 10 p.m. on a Saturday.

The relation that attaches an opening hours regime to a general class is:

<opening hour regime> [is the default opening regime for the class] <class> from which can be inferred:

<opening hour regime> [is the default opening regime for the business] <business>

This is the generator for calculating the default regime for a business from its class:

```
generator reg%, tp
g1: business$ [is an instance of] c
g2: reg% [is the default opening regime for the class] c
g1 [applies for timeperiod] tp1
g2 [applies for timeperiod] tp2
tp [is the timeperiod intersection of] [group: tp1; tp2]
=>
f: reg% [is the default opening regime for the business] business$
*
f [applies for timeperiod] tp
```

Default Regimes for a Business Using the Type and Location

Sometimes the location of a business is also important in determining the regime. Standard office hours in Germany are 8 a.m. to 4 p.m., unlike the 9 a.m. to 5 p.m. most common in the UK.

Parent Plus Attribute Classes (PPACs) represent the subclass of a class where the members have an attribute, for example [parent plus attribute class: [office]; [pertaining to geographical area: [germany]]] (i.e. 'German office'). PPACs (or conventional classes where the semantics include the geographical location) can be used to handle the problem of location-specific regimes, e.g.:

<opening hour regime> [is the default opening regime for the class] [parent plus attribute class: [office]; [pertaining to geographical area: [germany]]]

The generator described above can be used with geographical PPACs of this type just as with any other class of business.

Deciding if a Business is Open

There are two types of situations where it is necessary to know whether a business is open or not. The explicit situation is for giving a response to the user question "Is John Lewis open now?". Questions like "Where is the nearest place I can buy shoes?" sent from a mobile phone provide the implicit situation, in which it is preferable to give shops that are likely to be open.

Figure 8:
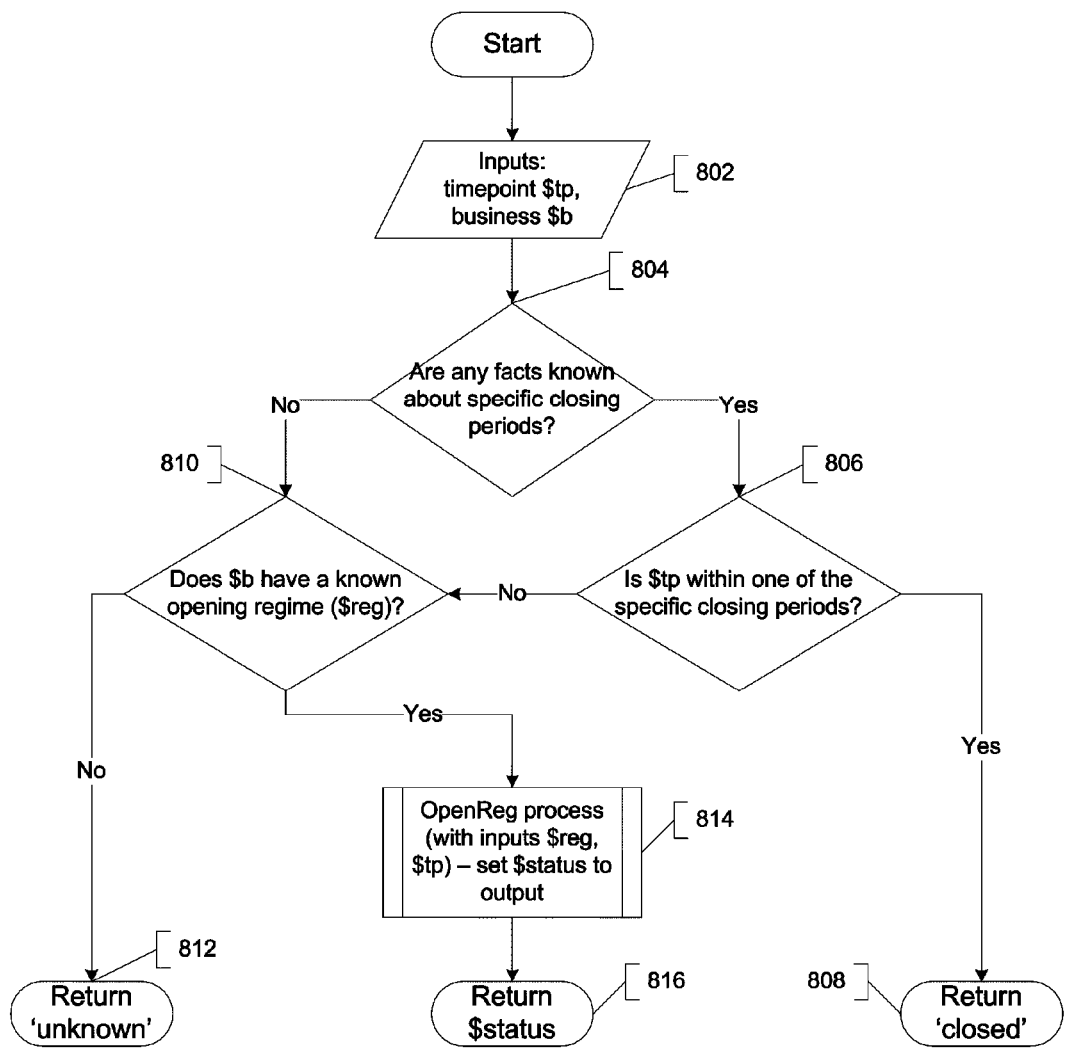
FIG. 8 shows a method for determining if a business is known to be open or closed at a specified time.

According to a specific embodiment the relation [applies to the business and timepoint] is used; this makes it possible to pass both the business and the timepoint into a tool. In the explicit situation, we test for the attribute [open for business] using the facts about specific closing times and any facts using the relation [is the opening regime for the business]. The details of this test are shown in FIG. 8, described here:

A business and a timepoint are input in Step 802. Step 804 involves searching for facts about specific closing periods. If any are found, and if the timepoint is found to lie within one (step 806) then "closed" is returned (step 808). Step 810 is performed when the timepoint does not lie within a specific closing period. This step involves searching for facts about a known opening regime. If none is found "unknown" is returned (step 812). Otherwise the 'OpenReg' process (FIG. 10, described below) is called with the timepoint and the regime as parameters (step 814) and the result of that process is returned (step 816).

Figure 9:
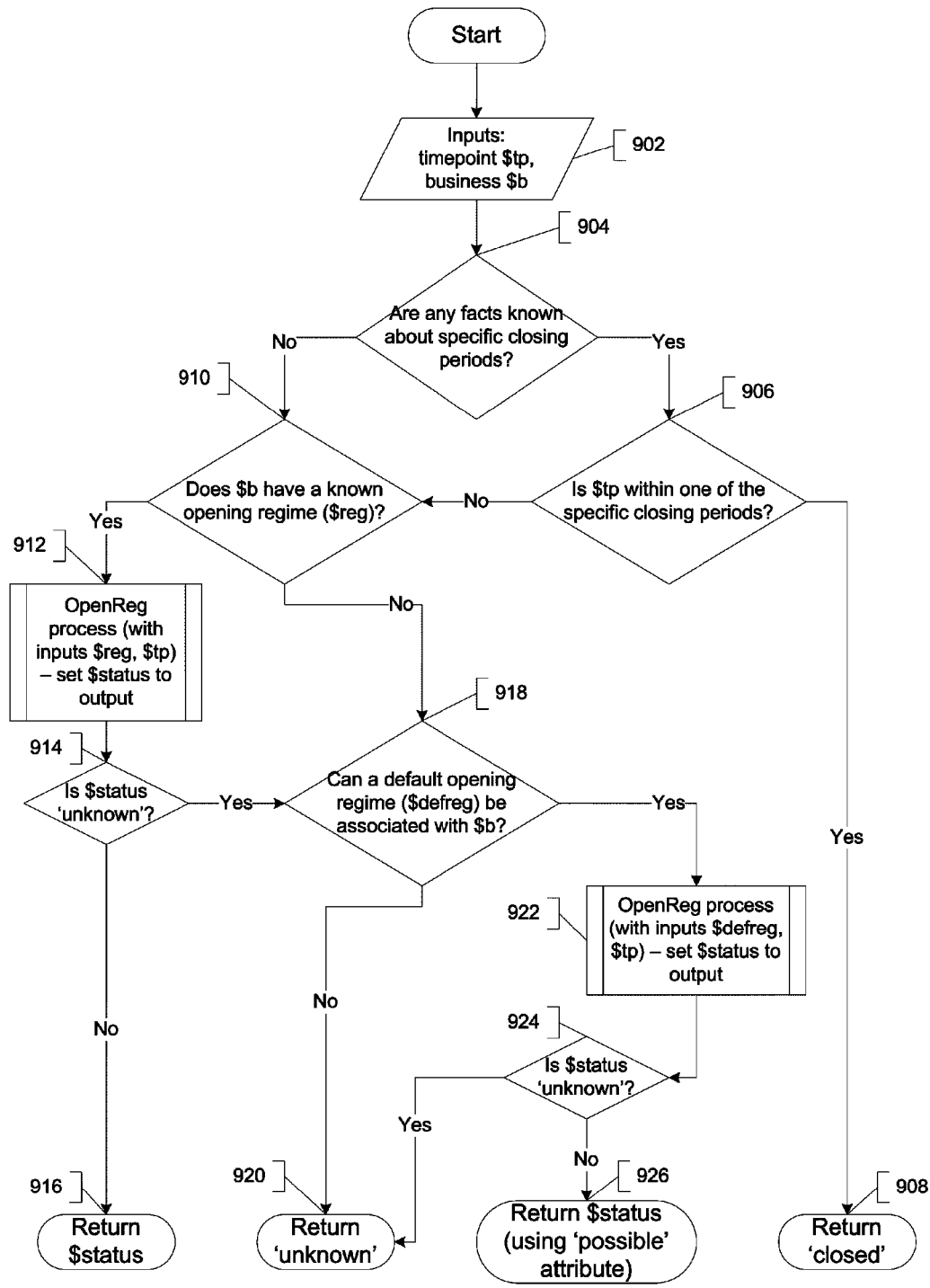
FIG. 9 shows a method for inferring that a business is likely to be open or closed at a specified time.

The attribute [believed or presumed open for business] is used in the implicit case. To infer that this attribute applies to a business, we use specific facts plus the relation [is the opening regime for the business] if such facts exist, and otherwise we turn to the default regime. FIG. 9 shows this method, described here:

A business and a timepoint are input in Step 902. Step 904 involves searching for facts about specific closing periods. If any are found, and if the timepoint is found to lie within one (step 906) then "closed" is returned (step 908). Step 910 is performed when the timepoint does not lie within a specific closing period. This step involves searching for facts about a known opening regime. If one is found the OpenReg process (FIG. 10, described below) is called with the opening regime and the timepoint as parameters (step 912). The status of the 'OpenReg' process is checked in step 914. If either "closed" or "open" was returned the test ends by returning this answer in step 916. If no regime was found in step 910, or if one was found but gave the result "unknown" in step 914, step 918 is performed. This step attempts to find a default opening regime for the business. If nothing is found "unknown" is returned (step 920). If one was found step 922 calls OpenReg with the default regime and the timepoint. If nothing is found "unknown" is returned (step 920). Otherwise the result of step 922 is returned, together with the information that this result may not be reliable.

Figure 10:
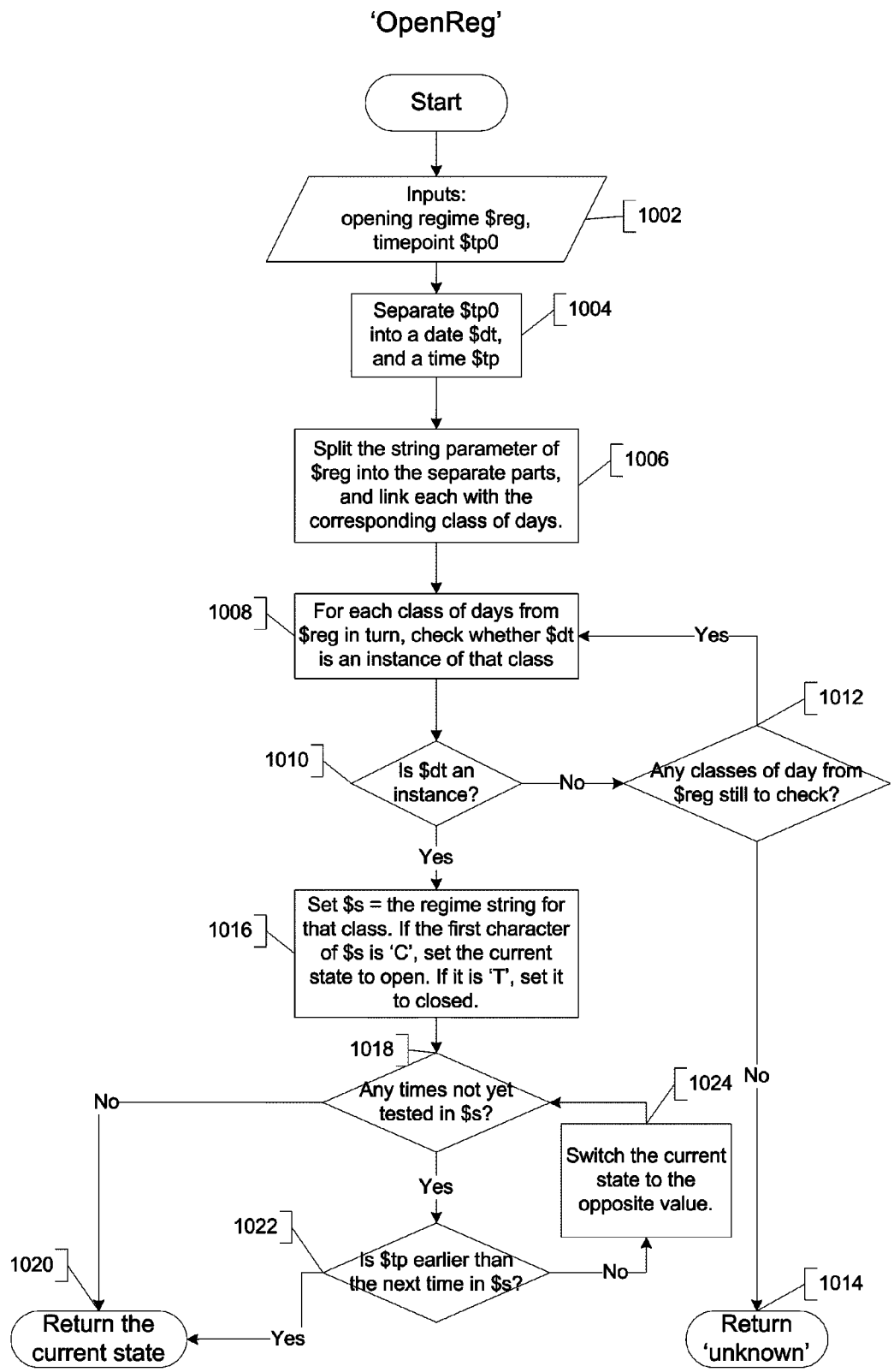
FIG. 10 illustrates a function used by the methods shown in FIGS. 8 and 9.

The 'OpenReg' process is illustrated in FIG. 10. The inputs are an opening regime and a timepoint (step 1002). The timepoint is split into a date and a time of day in step 1004. Step 1008 runs through the classes of days held in the opening regime in order. For each class, step 1010 checks whether the date is in the class. If not, step 1012 is called to decide whether every class in the regime has been checked. If step 1012 is called when there are no remaining classes the process returns "unknown" (step 1014). If a class containing the date is found within the regime during step 1010 then step 1016 is performed. In this step, the data in the regime is examined and the initial state is set to "open" or "closed". Step 1018 checks whether there are times listed in the regime that have not yet been checked. If there are none the current state is returned (step 1020). Step 1022 involves testing whether the next timepoint listed in the regime is earlier than the input time. If not, the current state is returned (step 1020). If it is found to be earlier then the "open"/"closed" state is switched to the other value and step 1018 is called again.

Note that it is important to use the local time at the location of the business when asking whether it is open.

Translating Questions

Natural-language questions about retailers and their opening hours can be translated on the True Knowledge platform (see description above for translation from natural-language to True Knowledge query language).

"Is Elemis open now?" translates as:

```
query
[current time] [applies to] now /1
f: [elemis] [is geographically located within] loc /e
f [applies at timepoint] now
tp [is the local time in] loc
[open for business] [applies to the business and timepoint]
[group: [elemis]; tp]
```

In an application where a user has set preferences to say they are only interested in businesses currently open, we can translate a question like "Show shoe shops in Paris" as:

```
query z
z [is an instance of] [shoe shop]
z [is geographically located within] [paris]
z [is geographically located within] loc
tp [is the local time in] loc
[believed or presumed open for business] [applies to the business
and timepoint] [group: z; tp]
```

Displaying the Hours for a Business

The opening hours string can easily be converted back into human-readable form. To do this a smart generator (see description above) would be required that takes the common translation of each class of days named in the regime and also the common translations of each of the times of the closing and opening actions, and pieces them together with the translations of the times to make a human-readable descriptive string.

Products

This section is about finding which businesses are probable or likely suppliers of a product.

Types of Product

We divide products up into different types. Broadly these are physical product-items and several types of non-physical product-concepts. The product-items are all subclasses of [retail product]; the others are all in the class [non-product]. If a user searches with a string that can denote both a product-item and a product-concept, then we should prefer the product-item interpretation to avoid needless disambiguation. This all happens inside a tool called by a smart generator via the relation [is the local search product for].

Product-Items

These are subclasses of [retail product]—any physical objects that are commonly retailed. Examples include [domestic dog], [pair of trousers], and [jar of jam]. In addition to physical items, this class also contains members of [event provided by an organization], which has subclasses like [haircut], [funeral], and [cruise].

This is the only class whose members we consider can be sold directly. Parametered objects are used to transform the other types into subclasses of [retail product].

Types of Publication

These are classes like [horror movie] and [novel]. They may look like the subclasses of [retail product], but they behave differently because you would buy a copy of one rather than a member of it. (Think of the difference between "I have bought the Times today" and "The Mirror Publishing Group has bought the Times today".)

A product-item equivalent of a type of publication is created via the parametered class [copy of a]. [retail product] has a subclass [physical publication], and this generator is used to link between published works and [physical publication]:

```
generator
x$ [is a subclass of] [published thing] /s
=>
[copy of a: x$] [is a subclass of] [physical publication]
``` and the copy classes are linked with this generator:

```
generator x%
y$ [is a subclass of] [published thing]
x1 [is a subclass of] y$
x% [is strictly equal to] [copy of a: x1]
=>
x% [is a subclass of] [copy of a: y$]
```

(and its equivalent where the left object is known).

Publications:

These are individual movies, books, etc, where the item being sold is a copy of the particular publication. We link these to subclasses of [retail product] in a similar way to that described for types of publication (see description above) with the parametered class [copy of]. This is the generator:

```
generator y%
x$ [is an instance of] y1
y1 [is a subclass of] [published thing]
y% [is strictly equal to] [copy of a: y1]
=>
[copy of: x$] [is a subclass of] y%
```

It will generate facts such as:

```
[copy of: [the da vinci code]] [is a subclass of] [copy of a:
[book]]
```

Substances:

This class contains objects like [jam] or [shampoo]. We link it to the physical classes with the general parametered class [quantity of] and with the two more specific classes, [measured quantity of] (used for, e.g., '2 oz sugar') and [quantity by container] (used for, e.g., 'jar of jam'). The links between them are generated with the fact:
[retail product] [is the parent of every] [quantity of]
and the following generators:

```
generator y%
x$ [is a subclass of] y1
y% [is strictly equal to] [quantity of: y1]
=>
[quantity of: x$] [is a subclass of] y%
generator y%
y% [is strictly equal to] [quantity of: x$]
=>
[measured quantity of: x$] [is a subclass of] y%
generator y%
y% [is strictly equal to] [quantity of: x$]
=>
[quantity by container of: x$; c$] [is a subclass of] y%
```

Activities

Activities include swimming, key-cutting, etc. An example of a product corresponding to an activity is: [session of: [swim]].

Professionals

For professional workers whose job corresponds to a type of business with an outlet, facts of this form are used:

```
["photographer"] [can denote the business type] [photographers
outlet]
```

The usual denotational relation [can denote] is not used in these cases because we don't want the word to be a synonym for the shop in other cases.

Other professionals without an outlet have their corresponding product encapsulated in an object such as, e.g., [services of: [midwife]].

Probable and Possible Retailers

For any retail product, there are some retailers by whom we can be almost certain that it is supplied, and others where there is still a reasonable chance (but rather less confidence) that it will be supplied. If one wanted to buy a tin of sweetcorn, a supermarket would be a very likely retailer, whereas a corner shop might sell such an item (but it would not be surprising if it didn't).

In various embodiments, when a user searches for a product, he or she could be presented with the two lists (probable and possible retailers) and a means to tell which shops are in which list. For example, if the shops were displayed as pins on a map, then the 'probable sellers' could be marked in red and the 'possible' ones in green.

We use different relations for these two cases:

```
<business> [is likely to sell members of] <subclass of retail
product>
and
<business> [is a possible supplier of] <subclass of retail
product>
```

Facts about What is Sold where

The simplest way to say that a shop sells a type of product is to assert a static fact, e.g.
[john lewis cambridge] [is likely to sell members of] [kettle]

Asserting a static fact like this for every combination of retailer and product is clearly not a scalable solution, so most of these facts must be generated by inference. The methods followed in a particular embodiment are described below, but other forms of inference are also possible and should be apparent to anyone skilled in the art.

'Probably Sells' Inference

We also know that a business [is likely to sell members of] a class if we know that all businesses of that type sell all products of that type. This is expressed by the generators below. The first gives the shops that sell a named product, and the second gives the products sold by a particular business:

```
generator a%, tp
g: d [is a class selling at least one member from] b$ /s
g [applies for timeperiod] tp
a% [is an instance of] d
=>
f: a% [is likely to sell members of] b$ *
f [applies for timeperiod] tp
generator b%, tp
a$ [is an instance of] d
g: d [is a class selling at least one member from] b% /s
g [applies for timeperiod] tp
=>
f: a$ [is likely to sell members of] b% *
f [applies for timeperiod] tp
```

This generator says that a dealer for a manufacturer is likely to sell all that manufacturer's products:

```
generator a%,tp
x [is the manufacturer of every] cl$ /s
g: a% [is a dealer for] x /s
g [applies for timeperiod] tp
=>
f: a% [is likely to sell members of] cl$ *
f [applies for timeperiod] tp
```

This says that a product is sold by a business if the business is part of a chain that sells that product in all its stores:

```
generator a%,tp
g: b$ [is a class sold by every branch of] c
a% [is an outlet of] c
g [applies for timeperiod] tp
=>
f: a% [is likely to sell members of] b$ *
f [applies for timeperiod] tp
```

We can add the facts statically, and we also pregenerate the facts involving [is a class sold by every branch of] and [is a class selling at least one member from] from the stronger relations [is sold by members of] and [is a core product sold by].

'Possibly Sells' Inference

This generator says that if a product is often sold by members of a class, then businesses in the class might possibly sell it:

```
generator a%, tp
b$ [is often sold by members of] c
g: a% [is an instance of] c
g [applies for timeperiod] tp
=>
f: a% [is a possible supplier of] b$ *
f [applies for timeperiod] tp
```

The following generator says that if a more specific type of a product is sold somewhere, then it could be a useful place to look for the more general product. For example, we know that pharmacies usually sell make-up mirrors, so if a user asks "Where can I buy a mirror?" then a pharmacy might possibly be able to meet his or her need.

```
generator a%, tp
x [is a subclass of] b$ /e
x [is sold by members of] c /s
g: a% [is an instance of] c
g [applies for timeperiod] tp
=>
f: a% [is a possible supplier of] b$ *
f [applies for timeperiod] tp
```

This is used to say that a shop that sells books might possibly sell copies of a named book, and similarly for other types of publication:

```
generator c%,tp
x$ [is an instance of] b
```

-continued

```
g: c% [is likely to sell members of] [copy of a: b]
g [applies for timeperiod] tp
=>
f: c% [is a possible supplier of] [copy of: x$] *
f [applies for timeperiod] tp
```

If a business sells a general class of items, then it might sell the direct subclasses of it (e.g. if a shop sells televisions, it might sell wide-screen televisions).

```
generator a%, tp
b$ [is a subclass of] c /e
c [is a core product sold by] shp /s
g: a% [is an outlet of] shp
g [applies for timeperiod] tp
=>
f: a% [is a possible supplier of] b$ *
f [applies for timeperiod] tp
```

If a business is part of a chain that stocks products made by a named manufacturer, then the business might sell a particular product from that manufacturer:

```
generator a%, tp
brand [is the manufacturer of every] b$ /s
gct: brand [is a brand stocked by every branch of] company /s
a% [is an outlet of] company
gct [applies for timeperiod] tp
=>
f: a% [is a possible supplier of] b$ *
f [applies for timeperiod] tp
```

Distances

This section describes how to find all objects of a particular type within a specified distance of a specified point.

Narrowing the Search

Searching through all the objects in the world to see which lie within an area generated on the fly is clearly infeasible. In some embodiments, the search can be narrowed by 'tiling the world' with grids of different sizes then computing which small set S of grid squares will cover the disc specified by the central point and distance. The grid squares that contain each object are pre-calculated, so it is simple to look up which objects lie within the set S.

We then search through the objects that pass this test and calculate which of those is within the required distance from the centre.

The following query uses the method described to find all Indian restaurants within 1 mile of True Knowledge's headquarters:

```
query obj
[current time] [applies to] now /1
f1: cords [is the co-ordinates of] [true knowledge]
f1 [applies at timepoint] now
csq [is the c-square version of the co-ordinates] cords
dist [is strictly equal to] [length: [integer: ["1"]]; [mile]]
csq_test [is a c-square to test for the point and distance]
[group: csq; dist]
f2: obj [is geographically located within] csq_test /s /j
f3: obj [is an instance of] [indian restaurant] /s/j
f2 [applies at timepoint] now
f3 [applies at timepoint] now
d2 [is the distance between] [group: obj; [true knowledge]]
d2 [is less than] dist
```

Tiling the World

Although many other methods are possible, specific embodiments use c-squares as the basis for tiling the world. This is an existing system which has been described elsewhere. See, for example, C-squares Specification—Version 1.1 by Tony Rees, CSIRO Marine and Atmospheric Research, Australia (December 2005), the entirety of which is incorporated herein by reference for all purposes.

Each c-square corresponds to a pair of latitude—longitude co-ordinates which can be specified to different degrees of accuracy. For example, the c-square specified by 56 degrees north and 90 degrees west is large (around 112 kilometers along the north-south edge), and the c-square specified by 56.12345 degrees north and 90.11111 degrees is a small square within the larger one.

A c-square is defined by a string such as "7307:487:380:383:495:246". The first digit specifies the quadrant of the world, and the other numbers come from interleaving the digits of decimal representations of the longitude and latitude, with a few extra digits to add more granularity. To compute which c-squares contain a given one, simply truncate the string two digits at a time. Each of the strings obtained in this way represent a larger c-square containing the previous one.

According to a specific embodiment, conversion to and from c-squares is done using the widely known method described in C-squares Specification—Version 1.1 incorporated by reference above.

Computing Good c-Squares to Test

In a question such as "List pubs within 1 mile of True Knowledge" the named location is first converted to a c-square. Various means of assigning co-ordinates to a location will be obvious to anyone skilled in the art, but in a particular embodiment co-ordinates for businesses or similar locations are generated from the postal code (using stored data) with the generator below (and a similar one for longitude).

```
generator x%, tp
gct: pc [is the postcode of] business$ /s
pc [is the postcode of the uk postcode area] area /s
x% [is the latitude of] area /s
gct [applies for timeperiod] tp
=>
fct: x% [is the latitude of] business$ *
fct [applies for timeperiod] tp
```

The c-squares corresponding to the co-ordinates are generated with this smart generator:

```
generator
=>lat_long_to_c_square@local
a [is the c-square version of the co-ordinates] tk_location$ *
```

The lat_long_to_c_square tool used by the smart generator implements the conversion method mentioned above.

The following relation is used to link c-squares that cover a disc of radius distance around the point c-square:

```
<c-square> [is a c-square to test for the point and distance]
<group by class: <c-square>; <distance>>
```

Figure 11:
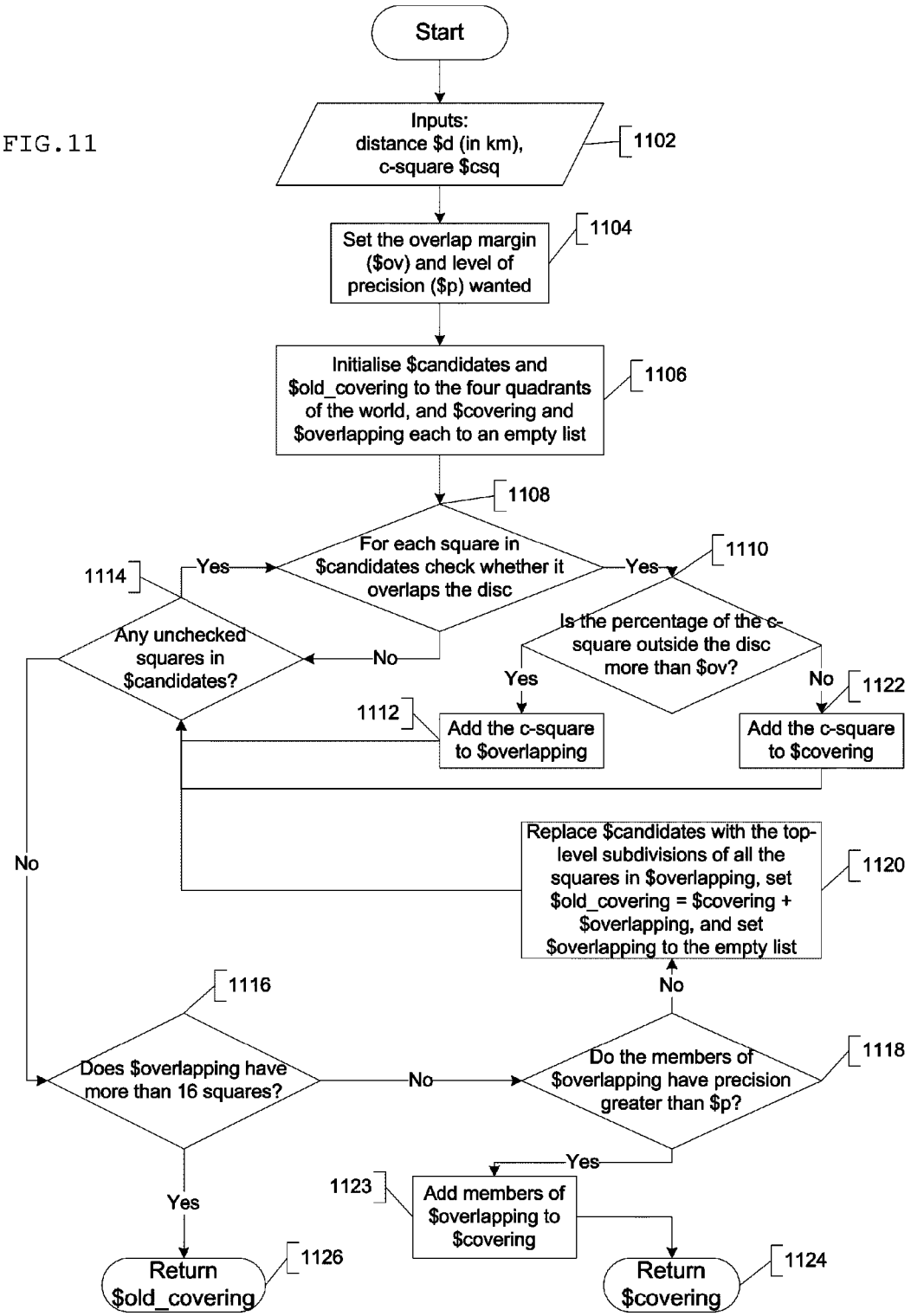
FIG. 11 shows a method for identifying the c-squares that cover a disc of a specified radius around a specified point.

It is implemented in a specific embodiment with the tool shown in FIG. 11, described here:

A distance and a c-square are input in step 1102, defining a disc with the c-square as the centre and the distance as the radius. The parameters for overlap and precision are set in step 1104. Arrays are initialised in step 1106. These are: a set of c-squares known to cover the disc, a list of candidate c-squares to try in an improved covering, a list of c-squares known to overlap with the disc, and the covering under construction. A c-square from the list of candidates is tested in step 1108. If it does not overlap the disc the next c-square is checked if one remains (steps 1114 and 1108). If the percentage of the overlapping c-square lying outside the disc is greater than the overlap value (checked in step 1110) it is added to the list of overlapping c-squares (step 1112), otherwise it is added to the new covering (step 1122). Once the list of candidates is empty, steps 1116 and 1118 are performed. Step 1116 checks if there are more than 16 overlapping c-squares to test. If so the previous covering is returned (step 1126). If the overlapping c-squares are more precise than necessary (step 1118) these are added to the covering (step 1123), and the covering is returned (step 1124). If steps 1116 and 1118 did not return, step 1120 is performed. This step constructs a new list of candidate c-squares by taking the top-level subdivisions of all the overlapping c-squares. The known covering is set to be the union of the constructed covering with the list of overlapping c-squares. The new list of overlapping squares is initialised to the empty set. The process continues by returning to step 1114.

Figure 12:
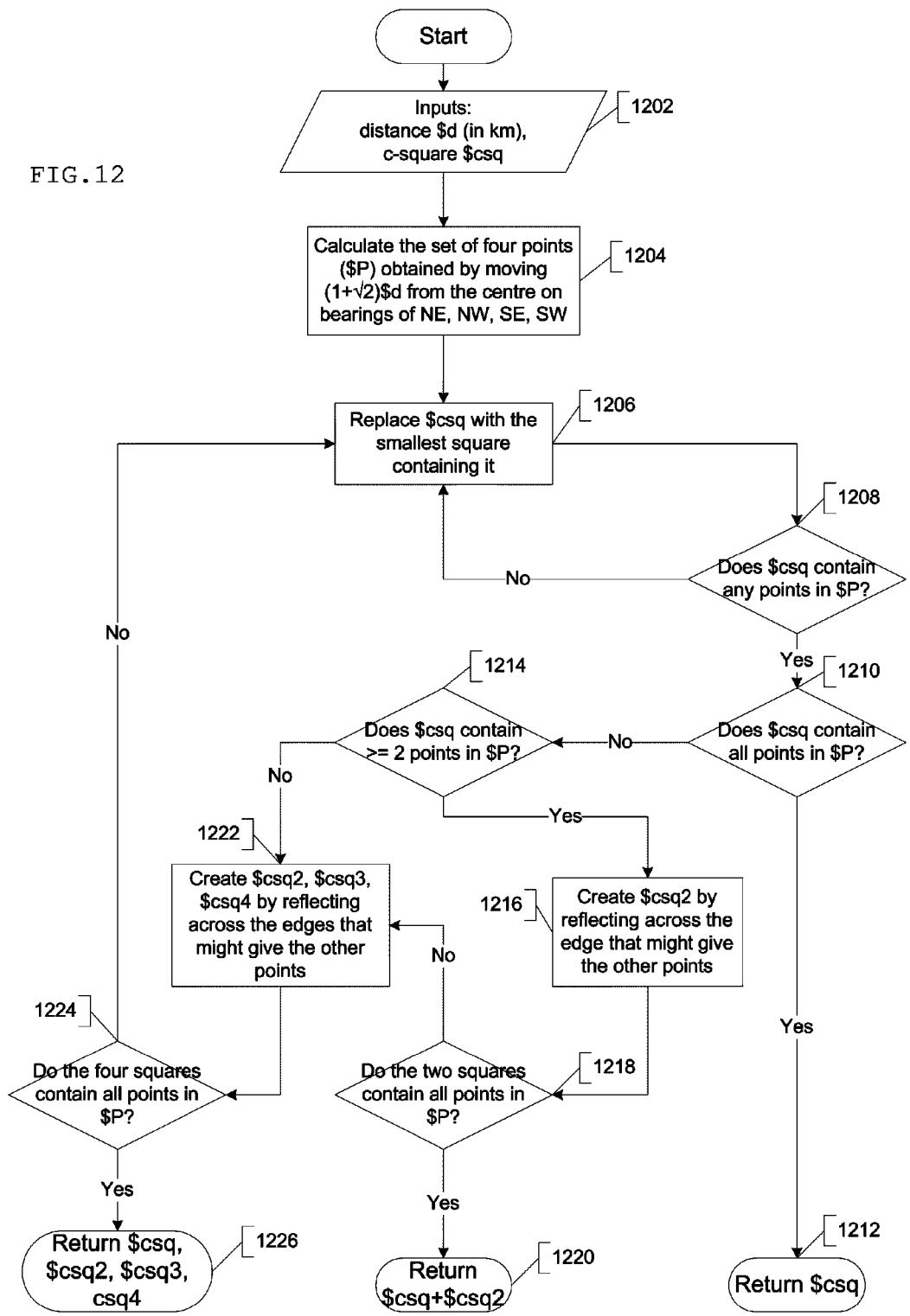
FIG. 12 shows an alternative method to that shown in FIG. 11 for identifying the c-squares that cover a disc of a specified radius around a specified point.

The alternative method illustrated in FIG. 12 is possibly more efficient and could be used in some embodiments; it is described here:

A disc is defined in step 1202 by inputting a distance and a c-square. Step 1204 specifies four points that define a quadrilateral sharing a centre with the disc. Step 1206 is performed—this replaces the initial c-square with the smallest one strictly containing it. If none of the four points are contained in the new c-square (step 1208), then step 1206 is repeated. If all the points lie in the new c-square (step 1210) the new c-square is returned as the covering (step 1212). If at least two of the points lie in the c-square, a second c-square is created by reflecting across an edge separating a covered point from an uncovered one (step 1216). If the two c-squares together form a covering this is returned (step 1220). Otherwise both c-squares are reflected across an edge separating covered from non-covered points (step 1222). If the four c-squares together contain all four points (step 1224), the covering is returned (step 1226). If the process failed to find a covering of the points step 1206 is performed again, replacing the reflected c-square with a larger one containing it.

Returning the Required Objects

Pregeneration (described above) is used in a specific embodiment to create facts that every object with known co-ordinates is located within a c-square containing those co-ordinates. The pregeneration rule uses the following header query:

```
query csq2,tp
  f: cor [is the co-ordinates of] x
  f [applies for timeperiod] tp
  csq [is the c-square version of the co-ordinates] cor
  csq [is geographically located within] csq2
```

It is triggered by a fact that x [is an instance of] [geographical area], and outputs the pair of facts:

```
g: x [is geographically located within] csq2
g [applies for timeperiod] tp
```

Consequently, at run time it is possible to quickly query each of the c-squares returned by the tool described elsewhere herein to find all objects contained within them and these can be filtered according to the type of object that the user is searching for. An object $obj returned from that process can then be accepted or discarded using a query such as the following, which checks whether the object is within distance $dist from the location p$:

```
query
  d [is the distance between] [group: $obj; p$]
  d [is less than] $dist
```

Combining the Queries

Various embodiments use 'umbrella' relations to link queries. The advantage of these relations is that it enables third parties to use them naïvely, and they will continue to work when lower-level generators are changed or representational changes are made.

One of these 'umbrella' relations, used in a particular embodiment, is the true-now relation:

```
<object with a geographical location> [is a member of the class
near the location] <group by class: <class>; <object with a
geographical location>>
```

A generator in a specific embodiment using this relation (for instances of [customer-facing business outlet]) is:

```
generator obj%
  cl$ [is a subclass of] [customer-facing business outlet]
  [current time] [applies to] now /1
  f1: cords [is the co-ordinates of] centre$
  f1 [applies at timepoint] now
  csq [is the c-square version of the co-ordinates] cords
  dist [is strictly equal to] [length: [integer: ["500"]]; [metre]]
  csq_test [is a c-square to test for the point and distance]
    [group: csq; dist]
  f2: obj% [is geographically located within] csq_test /s /j
  f2 [applies at timepoint] now
  f3: obj% [is an instance of] cl$ /s/j
  f3 [applies at timepoint] now
  d2 [is the distance between] [group: obj%; csq]
  d2 [is less than] dist
  =>
  obj% [is a member of the class near the location] [group: cl$;
    centre$] *
```

This generator effectively hardcodes 500 meters in its definition of 'near' (though other implementations would be possible with trivial changes such as writing different generators, or by combining generators and fetching the correct distance using a new relation [is the nearness distance for the class].

According to a specific embodiment, locations are divided into those which are [place is searchable around] (for small places such as businesses, train stations, or parks) and those which are [place is searchable within] (for settlements, countries, etc.).

If the place is searchable-within, the following, rather simpler, generator can be used:

```
generator obj%
  cl$ [is a subclass of] [customer-facing business outlet]
  [current time] [applies to] now /1
  f2: obj% [is geographically located within] centre$ /s /j
  f3: obj% [is an instance of] cl$ /s/j
  f2 [applies at timepoint] now
  f3 [applies at timepoint] now
  =>
  obj% [is a member of the class near the location] [group: cl$;
  centre$] *
```

Figure 13:
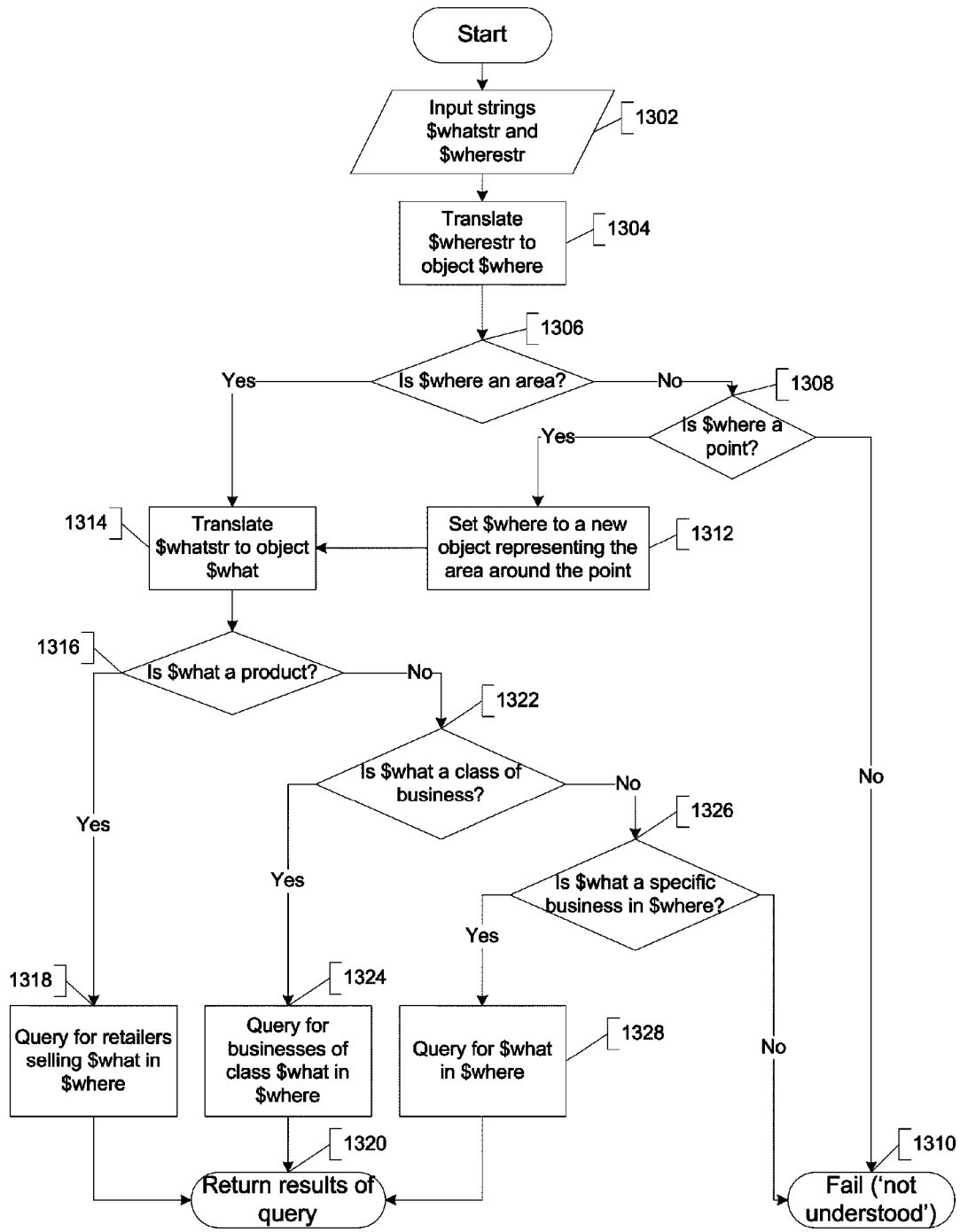
FIG. 13 illustrates how the techniques described herein are used in specific embodiments to answer a user's local retail search.

FIG. 13 illustrates how the techniques described above are used in a specific embodiment to answer a user's local retail search. The process begins (step 1302) with a pair of user inputs in natural language: $whatstr, denoting the thing sought (e.g. "pillows", "supermarket", "Harrods"), and $wherestr, denoting a place (either an area, e.g. "Cambridge", or a point such as a business premises or a landmark). The first step (1304) is to translate $wherestr into a True Knowledge object $where representing a place (multiple translations might be obtained; various embodiments might handle such a case in various ways—either choosing one and throwing away other translations, or choosing one and storing the others for a presentation of alternatives later, or requesting immediate disambiguation from the user). A test is then performed to determine whether $where is an area (step 1306), failing which it is tested to determine whether it is a point (step 1308). If $where is neither an area nor a point, then the process ends (step 1310), confessing to the user that it is unable to understand $wherestr appropriately. If, however, $where is a point location, a query is done to determine the most appropriate c-square containing $where, and $where is reset to the object representing that c-square (step 1312). If step 1306 found that $where was an area (or if $where was set to an area at step 1312), then $whatstr is translated into a True Knowledge object $what representing a product, a class of retailer, or a specific retailer (step 1314; similar options to those discussed earlier in this description exist in the case of multiple translations being found). If $what is determined to be a product (step 1316), a query is done to find retailers selling the product represented by $what in the area represented by $where (step 1318), and the results displayed to the user (step 1320). If $what is determined to be a class of businesses (step 1322), a query is done to find businesses in that class in the area represented by $where (step 1324), and the results displayed to the user (step 1320). If $what is determined to be a specific business located in the area represented by $where (step 1326), a query is done to find further information on that business (step 1328), and the results displayed to the user (step 1320). If $what cannot be identified as a product, a class of retailer, or a specific retailer, then the process ends (step 1310), confessing to the user that it is unable to understand $whatstr appropriately.

Figure 7:
FIG. 7 shows an embodiment doing a search for pillows within Cambridge UK.

A possible interface, representative of the one used in a particular embodiment, is shown in FIG. 7, demonstrating a search for pillows in Cambridge UK (Knowledge about what kinds of businesses typically sell bed accessories and specifically pillows has been used to compile a list of probable locations despite knowing nothing about the stock at these locations.).

While the invention has been particularly shown and described with reference to specific embodiments thereof, it will be understood by those skilled in the art that changes in the form and details of the disclosed embodiments may be made without departing from the spirit or scope of the invention. For example, embodiments of the invention have been described herein with reference to particular computing platforms and network environments. It will be understood, however, that the configuration of computing devices and network resources may vary considerably without departing from the scope of the invention.

In addition, the computer program instructions with which embodiments of the invention are implemented may be stored in any type of non-transitory computer-readable storage media, and may be executed according to a variety of computing models including a client/server model, a peer-to-peer model, on a stand-alone computing device, or according to a distributed computing model in which various of the functionalities described herein may be effected or employed at different locations.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A system for identifying retail locations likely to sell a particular product, comprising:
   one or more data stores having a database stored therein, the database including retail location information representing a plurality of retail locations, retail category information for at least some of the plurality of the retail locations, and product information representing a plurality of products, the product information including natural language representations of at least some of the products, each of the natural language representations comprising one or more natural language words representing the corresponding product, the database further including a plurality of mappings between the products and retail categories represented in the retail category information, the database further including product ontology information representing hierarchies of product categories, and retail category ontology information representing hierarchies of retail categories; and
   one or more computing devices configured to identify a subset of the retail locations in a particular geographic area likely to provide the particular product in response to a query identifying the particular product by making one or more inferences that each of the subset of the retail locations is characterized by a corresponding one of a plurality of different probabilities of being a supplier of the particular product, the probability corresponding to each of the subset of the retail locations being represented in the database by a corresponding relationship between one of the retail categories to which the retail location belongs and one of the product categories in which the particular product is included, a first retail location of the subset of the retail locations being inferred to be a probable supplier of the particular product, and a second retail location of the subset of the retail locations being inferred to be a possible supplier of the particular product, the one or more computing devices being configured to make the one or more inferences with reference to the particular product and the mappings between the products and the retail categories, and by extending the mappings using the product ontology information and the retail category ontology information to identify one or more relationships not explicitly represented in the database, the one or more computing devices further being configured to transmit a response to the query communicating the identified subset of the retail locations, including communicating the first retail location as a probable supplier of the particular product and communicating the second retail location as a possible supplier of the particular product.

2. The system of claim 1 wherein the one or more computing devices are further configured to identify the geographic area with reference to geographic information received in association with the query.

3. The system of claim 2 wherein the geographic information comprises one or more of a name of a geographic location, geographic coordinates, or a name of a landmark.

4. The system of claim 1 wherein the query comprises a natural language question asking where to buy the particular product, and wherein the one or more computing devices are further configured to interpret the natural language question.

5. The system of claim 1 wherein the one or more computing devices are further configured to identify the subset of the retail locations with reference to product stock information identifying specific ones of the retail locations stocking specific ones of the products.

6. The system of claim 1 wherein the database further includes business hours information identifying business hours for specific ones of the retail locations, and wherein the one or more computing devices are further configured to identify the subset of the retail locations with reference to the business hours information.

7. The system of claim 6 wherein the one or more computing devices are configured to identify the subset of the retail locations with reference to the business hours information by inferring first business hours for a third one of the subset of the retail locations from the business hours associated with one or more of the specific retail locations having specified business hours, wherein the third retail location and the one or more of the specific retail locations having specified business hours have associated retail categories that are related.

8. The system of claim 1 wherein the one or more computing devices are configured to operate in conjunction with a search engine, and wherein the query is received via a search interface associated with the search engine.

9. The system of claim 1 wherein the response to the query further communicates a real time location of a user who entered the query formatted for presentation in a mobile device interface in conjunction with representations of the subset of the retail locations.

10. The system of claim 1 wherein the one or more data stores and one or more computing devices are configured as a general structured knowledge and inference system, wherein the database includes data corresponding to a knowledge base and representing first knowledge about a plurality of objects using a plurality of relationships between pairs of the objects, and wherein the one or more computing devices are configured to interact with the knowledge base and generate second knowledge not represented in the knowledge base from the first knowledge by inference.

11. A computer implemented method for identifying retail locations likely to sell a particular product, comprising:
receiving a query from a remote computing device with a computing system, the query identifying a particular product;
connecting with a database associated with the computing system, the database including retail location information representing a plurality of retail locations, retail category information for at least some of the plurality of the retail locations, and product information representing a plurality of products, the product information including natural language representations of at least some of the products, each of the natural language representations comprising one or more natural language words representing the corresponding product, the database further including a plurality of mappings between the products and retail categories represented in the retail category information, the database further including product ontology information representing hierarchies of product categories, and retail category ontology information representing hierarchies of retail categories;
using the computing system to identify in the database a subset of the retail locations in a particular geographic area likely to provide the particular product in response to a query identifying the particular product by making one or more inferences that each of the subset of the retail locations is characterized by a corresponding one of a plurality of different probabilities of being a supplier of the particular product, the probability corresponding to each of the subset of the retail locations being represented in the database by a corresponding relationship between one of the retail categories to which the retail location belongs and one of the product categories in which the particular product is included, a first retail location of the subset of the retail locations being inferred to be a probable supplier of the particular product, and a second retail location of the subset of the retail locations being inferred to be a possible supplier of the particular product, the one or more inferences being made with reference to the particular product and the mappings between the products and the retail categories, and by extending the mappings using the product ontology information and the retail category ontology information to identify one or more relationships not explicitly represented in the database; and
transmitting a response to the query to the remote computing device communicating the identified subset of the retail locations, including communicating the first retail location as a probable supplier of the particular product and communicating the second retail location as a possible supplier of the particular product.

12. The computer implemented method of claim 11 further comprising identifying the geographic area with reference to geographic information received in association with the query.

13. The computer implemented method of claim 12 wherein the geographic information comprises one or more of a name of a geographic location, geographic coordinates, or a name of a landmark.

14. The computer implemented method of claim 11 wherein the query comprises a natural language question asking where to buy the particular product, the method further comprising interpreting the natural language question.

15. The computer implemented method of claim 11 further comprising identifying the subset of the retail locations with reference to product stock information identifying specific ones of the retail locations stocking specific ones of the products.

16. The computer implemented method of claim 11 wherein the database further includes business hours information identifying business hours for specific ones of the retail locations, the method further comprising identifying the subset of the retail locations with reference to the business hours information.

17. The computer implemented method of claim 16 wherein identifying the subset of the retail locations with reference to the business hours information comprises inferring first business hours for a third one of the subset of the retail locations from the business hours associated with one or more of the specific retail locations having specified business hours, wherein the third retail location and the one or more of the specific retail locations having specified business hours have associated retail categories that are related.

18. The computer implemented method of claim 11 further comprising operating in conjunction with a search engine, wherein the query is received via a search interface associated with the search engine.

19. The computer implemented method of claim 11 wherein the response to the query further communicates a real time location of a user who entered the query formatted for presentation in a mobile device interface in conjunction with representations of the subset of the retail locations.

20. The computer implemented method of claim 11 wherein the database and computing system are part of a general structured knowledge and inference system, wherein the database includes data corresponding to a knowledge base and representing first knowledge about a plurality of objects using a plurality of relationships between pairs of the objects, and wherein identifying the one or more retail locations involves the computing system interacting with the knowledge base and generating second knowledge not represented in the knowledge base from the first knowledge by inference.

21. A search engine configured to identify retail locations likely to sell a particular product, comprising:
one or more data stores having a database stored therein, the database including retail location information representing a plurality of retail locations, retail category information for at least some of the plurality of the retail locations, and product information representing a plurality of products, the product information including natural language representations of at least some of the products, each of the natural language representations comprising one or more natural language words representing the corresponding product, the database further including a plurality of mappings between the products and retail categories represented in the retail category information, the database further including product ontology information representing hierarchies of product categories, and retail category ontology information representing hierarchies of retail categories; and
one or more computing devices configured to:
receive a query entered into a search interface associated with the search engine;
determine that the query is a product search identifying the particular product and a geographic area;
identify subset of the of the retail locations in the particular geographic area likely to provide the particular product by making one or more inferences that each of the subset of the retail locations is characterized by a corresponding one of a plurality of different probabilities of being a supplier of the particular product, the probability corresponding to each of the subset of the retail locations being represented in the database by a corresponding relationship between one of the retail categories to which the retail location belongs and one of the product categories in which the particular product is included, a first retail location of the subset of the retail locations being inferred to be a probable supplier of the particular product, and a second retail location of the subset of the retail locations being inferred to be a possible supplier of the particular product, the one or more inferences being made with reference to the particular product and the mappings between the products and the retail categories, and by extending the mappings using the product ontology information and the retail category ontology information to identify one or more relationships not explicitly represented in the database, and
transmit a response to the query communicating the identified subset of the retail locations, including communicating the first retail location as a probable supplier of the particular product and communicating the second retail location as a possible supplier of the particular product.

22. A computer program product for identifying retail locations likely to sell a particular product, comprising one or more non-transitory computer readable storage media having computer program instructions stored therein configured for execution by one or more computing devices to thereby cause the one or more computing devices to:
receive a query from a remote computing device, the query identifying a particular product;
connect with a database associated with the computing system, the database including retail location information representing a plurality of retail locations, retail category information for at least some of the plurality of the retail locations, and product information representing a plurality of products, the product information including natural language representations of at least some of the products, each of the natural language representations comprising one or more natural language words representing the corresponding product, the database further including a plurality of mappings between the products and retail categories represented in the retail category information, the database further including product ontology information representing hierarchies of product categories, and retail category ontology information representing hierarchies of retail categories;
identify in the database a subset of the retail locations in a particular geographic area likely to provide the particular product in response to a query identifying the particular product by making one or more inferences that each of the subset of the retail locations is characterized by a corresponding one of a plurality of different probabilities of being a supplier of the particular product, the probability corresponding to each of the subset of the retail locations being represented in the database by a corresponding relationship between one of the retail categories to which the retail location belongs and one of the product categories in which the particular product is included, a first retail location of the subset of the retail locations being inferred to be a probable supplier of the particular product, and a second retail location of the subset of the retail locations being inferred to be a possible supplier of the particular product, the one or more inferences being made with reference to the particular product and the mappings between the products and the retail categories, and by extending the mappings using the product ontology information and the retail category ontology information to identify one or more relationships not explicitly represented in the database; and transmit a response to the query to the remote computing device communicating the identified subset of the retail locations, including communicating the first retail location as a probable supplier of the particular product and communicating the second retail location as a possible supplier of the particular product.

* * * * *